(12) United States Patent
TeGrotenhuis et al.

(10) Patent No.: US 7,520,917 B2
(45) Date of Patent: Apr. 21, 2009

(54) DEVICES WITH EXTENDED AREA STRUCTURES FOR MASS TRANSFER PROCESSING OF FLUIDS

(75) Inventors: Ward E. TeGrotenhuis, Kennewick, WA (US); Robert S. Wegeng, Richland, WA (US); Greg A. Whyatt, West Richland, WA (US); David L. King, Richland, WA (US); Kriston P. Brooks, Kennewick, WA (US); Victoria S. Stenkamp, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 588 days.

(21) Appl. No.: 11/061,237

(22) Filed: Feb. 18, 2005

(65) Prior Publication Data

US 2005/0247552 A1 Nov. 10, 2005

Related U.S. Application Data

(60) Provisional application No. 60/573,160, filed on May 21, 2004, provisional application No. 60/599,718, filed on Aug. 5, 2004, provisional application No. 60/546,114, filed on Feb. 18, 2004.

(51) Int. Cl.
*B01D 53/14* (2006.01)

(52) U.S. Cl. ............... 95/210; 95/241; 165/272; 165/276; 422/190; 422/198; 422/211; 48/197 R; 203/21; 203/89

(58) Field of Classification Search .......... 422/198, 422/190, 211; 436/139, 140, 141, 142, 143; 48/197 R; 165/165
See application file for complete search history.

(56) References Cited

U.S. PATENT DOCUMENTS

| | | | |
|---|---|---|---|
| 4,597,947 A * | 7/1986 | Almaula | 422/191 |
| 5,180,561 A | 1/1993 | Morishima et al. | |
| 5,674,301 A | 10/1997 | Sakai et al. | |
| 5,811,062 A | 9/1998 | Wegeng et al. | |
| 6,126,723 A | 10/2000 | Drost et al. | |
| 6,159,434 A | 12/2000 | Gonjo et al. | |
| 6,192,596 B1 * | 2/2001 | Bennett et al. | 34/76 |

(Continued)

FOREIGN PATENT DOCUMENTS

WO    WO 03/033983 A2    4/2003

(Continued)

*Primary Examiner*—Glenn A Caldarola
*Assistant Examiner*—Taiwo Oladapo
(74) *Attorney, Agent, or Firm*—Derek H. Maughan

(57) ABSTRACT

A microchannel device includes several mass transfer microchannels to receive a fluid media for processing at least one heat transfer microchannel in fluid communication with a heat transfer fluid defined by a thermally conductive wall, and at several thermally conductive fins each connected to the wall and extending therefrom to separate the mass transfer microchannels from one another. In one form, the device may optionally include another heat transfer microchannel and corresponding wall that is positioned opposite the first wall and has the fins and the mass transfer microchannels extending therebetween.

20 Claims, 19 Drawing Sheets

U.S. PATENT DOCUMENTS

| | | |
|---|---|---|
| 6,238,815 B1 * | 5/2001 | Skala et al. .................... 429/17 |
| 6,251,228 B1 * | 6/2001 | Marks et al. ................... 203/50 |
| 6,488,838 B1 | 12/2002 | Tonkovich et al. |
| 6,503,298 B1 | 1/2003 | Monzyk et al. |
| 6,508,862 B1 | 1/2003 | Tonkovich et al. |
| 6,630,012 B2 | 10/2003 | Wegeng et al. |
| 6,652,830 B2 | 11/2003 | Wang et al. |
| 6,660,237 B2 | 12/2003 | Wang et al. |
| 6,666,909 B1 | 12/2003 | TeGrotenhuis et al. |
| 6,680,044 B1 | 1/2004 | Tonkovich et al. |
| 6,746,515 B2 | 6/2004 | Wegeng et al. |
| 6,814,781 B2 | 11/2004 | Tonkovich et al. |
| 2002/0144600 A1 | 10/2002 | TeGrotenhuis et al. |
| 2003/0072699 A1 | 4/2003 | Tonkovich et al. |
| 2003/0180216 A1 | 9/2003 | TeGrotenhuis et al. |
| 2003/0185721 A1 | 10/2003 | Wang et al. |
| 2003/0188475 A1 | 10/2003 | Ahmed et al. |
| 2003/0221554 A1 | 12/2003 | TeGrotenhuis et al. |
| 2004/0013585 A1 | 1/2004 | Whyatt et al. |
| 2004/0033455 A1 | 2/2004 | Tonkovich et al. |
| 2004/0034266 A1 | 2/2004 | Brophy et al. |
| 2004/0076562 A1 | 4/2004 | Manzanec et al. |
| 2004/0105812 A1 | 6/2004 | Tonkovich et al. |
| 2004/0132613 A1 | 7/2004 | Brophy et al. |
| 2004/0220434 A1 | 11/2004 | Brophy et al. |
| 2004/0228781 A1 | 11/2004 | Tonkovich et al. |
| 2004/0229752 A1 | 11/2004 | Long et al. |

FOREIGN PATENT DOCUMENTS

| | | |
|---|---|---|
| WO | WO 2004/016347 A2 | 2/2004 |
| WO | WO 2004/067138 A2 | 8/2004 |
| WO | WO 2004/091772 A1 | 10/2004 |
| WO | WO 2004/104140 A1 | 12/2004 |

* cited by examiner

DEVICES WITH EXTENDED AREA STRUCTURES FOR MASS TRANSFER PROCESSING OF FLUIDS

REFERENCE TO RELATED APPLICATIONS

The present application claims the benefit of U.S. Provisional Application No. 60/546,114 filed Feb. 18, 2004, U.S. Provisional Application No. 60/573,160 filed May 21, 2004, and U.S. Provisional Application No. 60/599,718 filed Aug. 5, 2004, all of which are hereby incorporated by reference. The present application is related to International Patent Application No. PCT/US2004/015402 filed May 17, 2004 (International Publication No. WO 2004/104140), U.S. patent application Ser. No. 10/385,831 filed Mar. 11, 2003 (Publication No. U.S. 2003/0180216), U.S. patent application Ser. No. 10/011,386 filed Dec. 5, 2001 (Publication No. U.S. 2002/0144600), U.S. patent application Ser. No. 10,717,608 filed on Nov. 21, 2003, U.S. patent application Ser. No. 09/640,903 filed Aug. 16, 2000 (now U.S. Pat. No. 6,680,044), and U.S. patent application Ser. No. 09/588,871 filed Jun. 6, 2000 (Now U.S. Pat. No. 6,666,909), all of which are hereby incorporated by reference.

GOVERNMENT RIGHTS

This invention was made with Government support under Contract DE-AC0676RLO1830 awarded by the U.S. Department of Energy. The Government has certain rights in the invention.

BACKGROUND

The present invention is directed to fluid processing techniques. More particularly, but not exclusively, the present invention is directed to microchannel processing of fluids with heat exchange.

The use of microchannel devices to enhance various chemical processes has increasingly become a topic of interest. In some instances, microchannels to process fluid and microchannels to transfer heat are integrated together in the same device. Frequently, these two channel types are coextensive along a separating wall. One drawback of this arrangement is that mass transfer and heat transfer characteristics become dependent on one another to a greater extent than may be desired. The efficiency of certain chemical reactions and chemical separations can be limited by such dependence.

Alternatively or additionally, for certain highly endothermic or exothermic reactions, separate cooling stages may be desired to provide a specific reaction temperature profile. Unfortunately, current schemes can hamper efficiency and/or reactor size reduction. Thus, there is an ongoing need for further contributions in these areas.

SUMMARY

One embodiment of the present invention includes a unique fluid processing technique. Other embodiments include unique systems, methods, devices, and apparatus to perform fluid processing with heat exchange. Further embodiments, forms, features, aspects, benefits, objects, and advantages shall become apparent from the detailed description and figures provided herewith.

DESCRIPTION OF EMBODIMENTS

Figure 1:
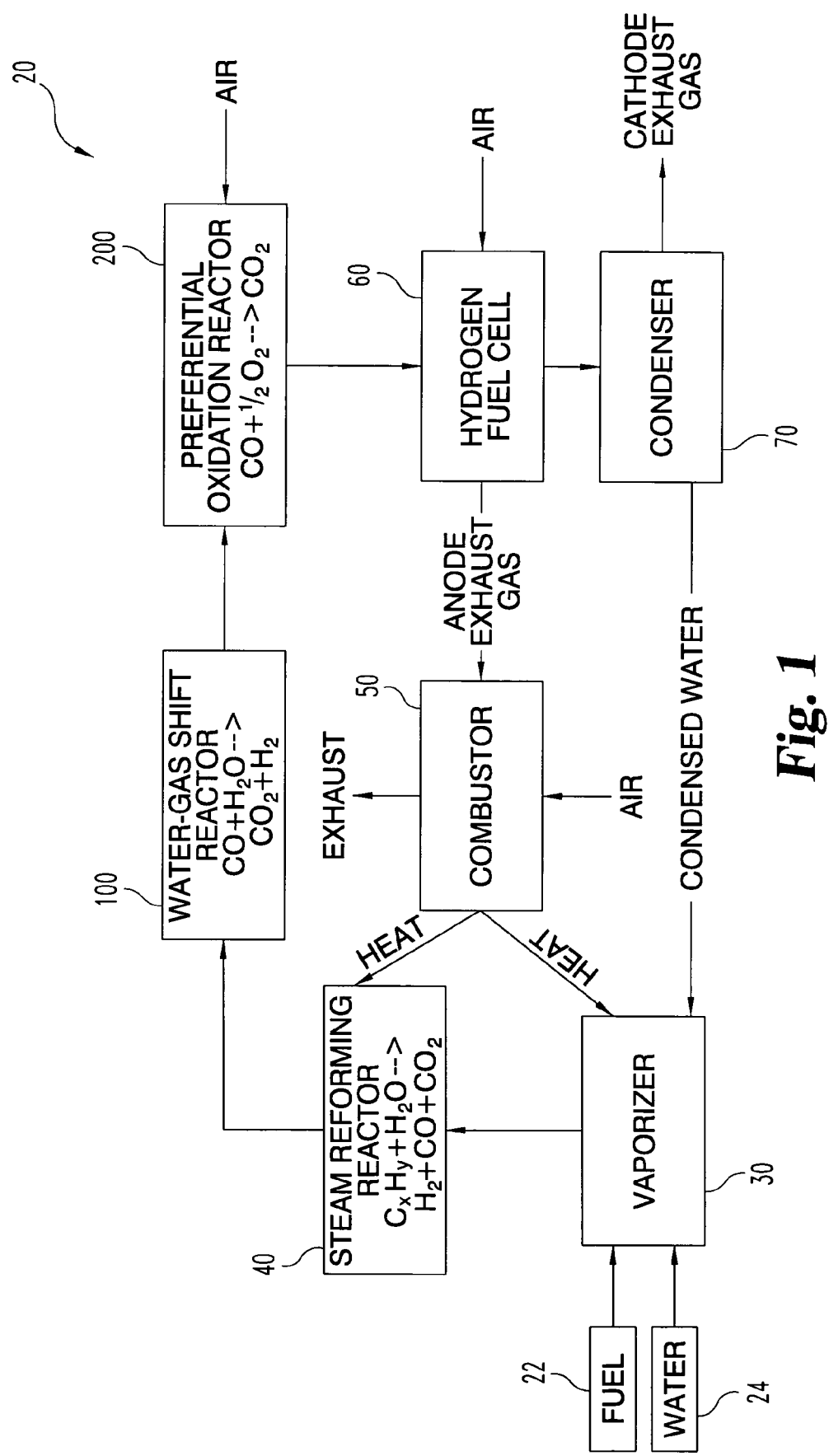
FIG. 1 is a diagrammatic view of a fuel processing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A "microchannel" refers to a channel with at least one dimension less than about 1 cm, preferably less than about 1 mm, and more preferably less than about 0.5 mm. Other dimensions of a microchannel may be any magnitude. A microchannel includes any channels having a dimension between 1 mm and 1 cm that are sometimes called mesochannels.

A "fluid" refers to any substance that conforms to the shape of its container, including a liquid, a gas, a combination of two or more gases, a combination of two or more liquids, a combination of one or more gases and one or more liquids. A fluid can optionally include one or more types of solid particles carried therewith.

A "catalyst material" refers to any matrix, fiber, porous solid, or other solid state structure that is coated with, combined with, carries or otherwise includes one or more catalysts.

A "capture structure" is a structure disposed (at least partly) within a microchannel that assists or directs movement of a liquid.

"We" is a unit abbreviation of Watts electric power output by a corresponding fuel cell.

"Microchannel Volume" refers to the collective volume of all microchannels in a device including any catalyst, catalyst material, catalyst matrix, catalyzing structure, catalyst support material, capture structure, liquid conveying structure, liquid directing structure, or other processing structure included in one or more of the microchannels.

"Total volume" of a device refers to the volume of all microchannels, chambers, headers, or other spaces in the device and all structure forming the device.

In one embodiment, unique microchannel structures are utilized to perform mass transfer processing of fluids flowing through mass transfer microchannels and regulate temperature of this process with a heat transfer fluid flowing through heat transfer microchannels. Such processing can include separation of one or more constituents from a fluid mixture (such as adsorption, absorption, desorption, distillation, or condensation processes), catalytic chemical reactions, or noncatalytic reactions, just to name a few.

In another embodiment, unique microchannel structures are used to extract hydrogen from hydrocarbon-based vehicle fuel to facilitate fuel cell powered vehicles. These fuels can be provided with the existing petroleum fuel infrastructure. In one form, a series of reactors employ microchannel structures to provide heat to a highly endothermic steam reforming reaction to maintain high conversions, control the temperature profile for an exothermic WGS reaction, and provide for a PROX reaction to reduce CO concentration in a hydrogen gas stream directed to the fuel cell.

Referring to FIG. 1, yet a further embodiment is illustrated as fuel processing system 20. System 20 includes liquid hydrocarbon fuel source 22 and water source 24 to supply fuel and water, respectively, to vaporizer 30. Vaporizer 30 provides a fluid mixture of vaporized fuel ($C_xH_y$) and water ($H_2O$) as reactants to steam reforming reactor 40. Steam reforming reactor 40 generates a fluid including molecular hydrogen, carbon monoxide, carbon dioxide, and water to Water-Gas Shift (WGS) reactor 100 in accordance with reaction (1) as follows:

$$C_xH_y + H_2O \rightarrow H_2 + CO + CO_2 \quad (1)$$

Because steam reforming based on reaction (1) is endothermic, combustor 50 is utilized to provide heat to steam reforming reactor 40 in an amount sufficient to maintain a desired conversion rate. Combustor 50 is fueled by molecular hydrogen that is output as anode exhaust by fuel cell 60, and also provides heat to operate vaporizer 30.

Figure 2:
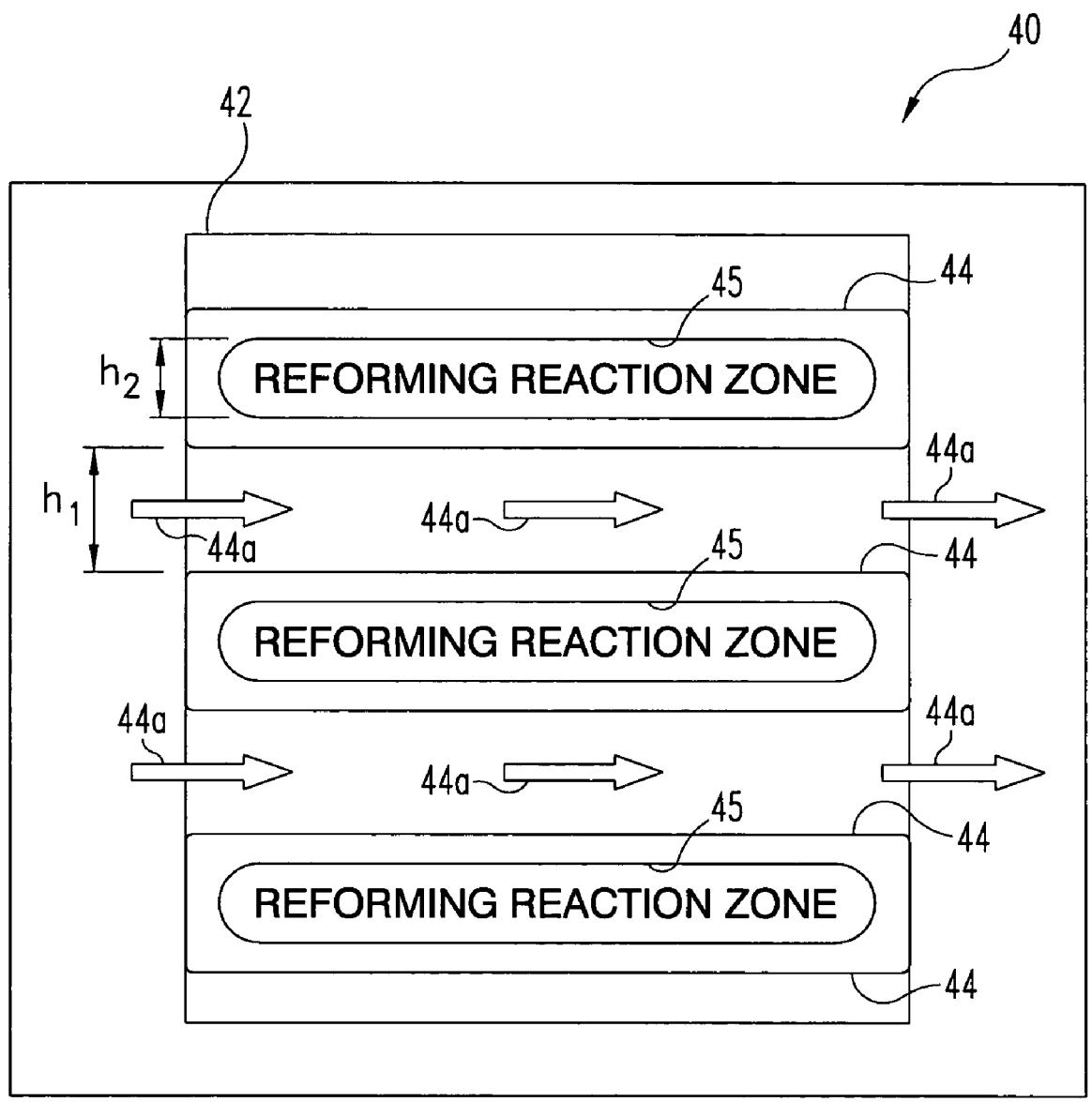
FIG. 2 is a partial, diagrammatic view of a steam reforming device included in FIG. 1.

It has been discovered that the high surface area per unit volume and short heat transfer distances realized with microchannel processing provide a way to efficiently add heat to reaction (1) and maintain relatively high conversion. Furthermore, small mass transfer distances generally reduce diffusion resistance and allow the reaction to be maintained near its kinetic limit. As diagrammatically depicted in FIG. 2, steam reforming reactor 40 includes at least one microchannel device 42. Microchannel device 42 receives a heat exchange fluid in the form of hot air from combustor 50 in heat exchange microchannels 44 in the direction indicated by arrows 44a. The reformate gas travels through reaction microchannels 45 that are defined by a thermally conductive material, such as metal. This material is convectively heated by heat exchange fluid passing through microchannels 44. Travel of the reformate gas through microchannels 45 is crossflow relative to the heat exchange fluid such that it travels in a direction that is perpendicular to the view plane of FIG. 2 and arrows 44a. Microchannels 44 are interleaved with microchannels 45. The length of travel of heat exchange fluid through heat exchange microchannels 44 is considerably shorter relative to the length of travel of reformate gas through reaction microchannels 45. In typical applications, the quantity of interleaved microchannels 44 and 45 would be more numerous than that depicted, but are not shown in FIG. 2 to preserve clarity.

Reaction microchannels 45 each contain felt coated with a standard precious metal catalyst (not shown) of a type suitable to perform reaction (1) at a desired rate. In one experimental embodiment, device 42 was sized and shaped as a panel approximately 80 cm³ in volume (including headers) and was designed for 500 We operation with a pressure drop of approximately 1 inch $H_2O$ across the combustion gas side. It was discovered that this arrangement provides a desirably high heat transfer, low pressure drop, and also minimizes overheating with the hot combustion gases. The relatively short diffusion length within each of microchannels 44 provides high heat transfer, and this short distance provides for low pressure drop. By using the interleaved approach, where each combustion channel is directly next to two reaction channels, heat need only transfer through the thermally conductive material separating one heat exchange microchannel 44 from the two bordering reaction microchannels 45. Height h2 of microchannels 45 is much less than height h1 of microchannels 44, which typically results in a convection coefficient for the reformate that is higher than the heat exchange (air) side. Correspondingly, the metal temperature of reactor 40 can be held near reforming temperature and facilitates a relatively higher gas inlet temperature. Furthermore, a relatively thin device in the direction of arrow 44a tends to increase conduction from front to back to reduce metal temperature gradient, allowing higher gas temperature without excessively high metal temperature.

Figure 3:
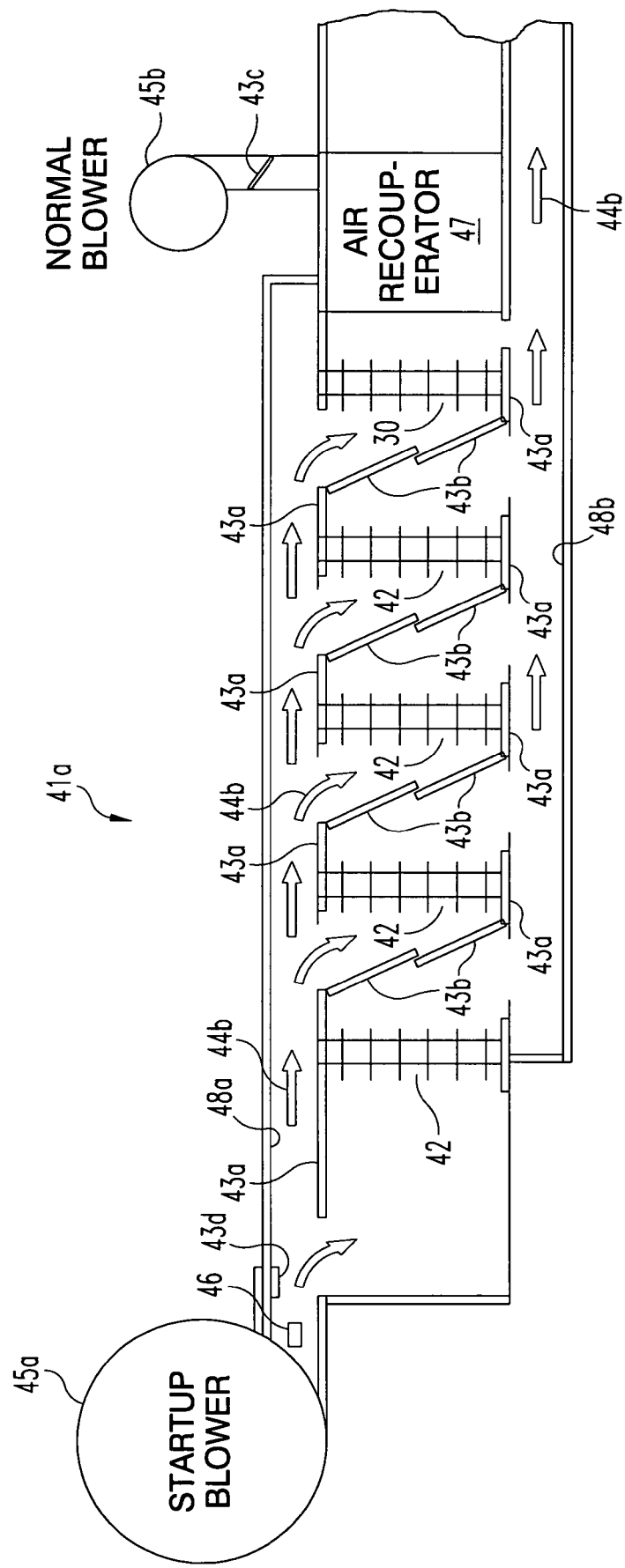
FIGS. 3 and 4 are partial, diagrammatic views of a reactor/vaporizer subsystem in a start-up configuration and in a sustained operation configuration following start-up, respectively.
Figure 4:
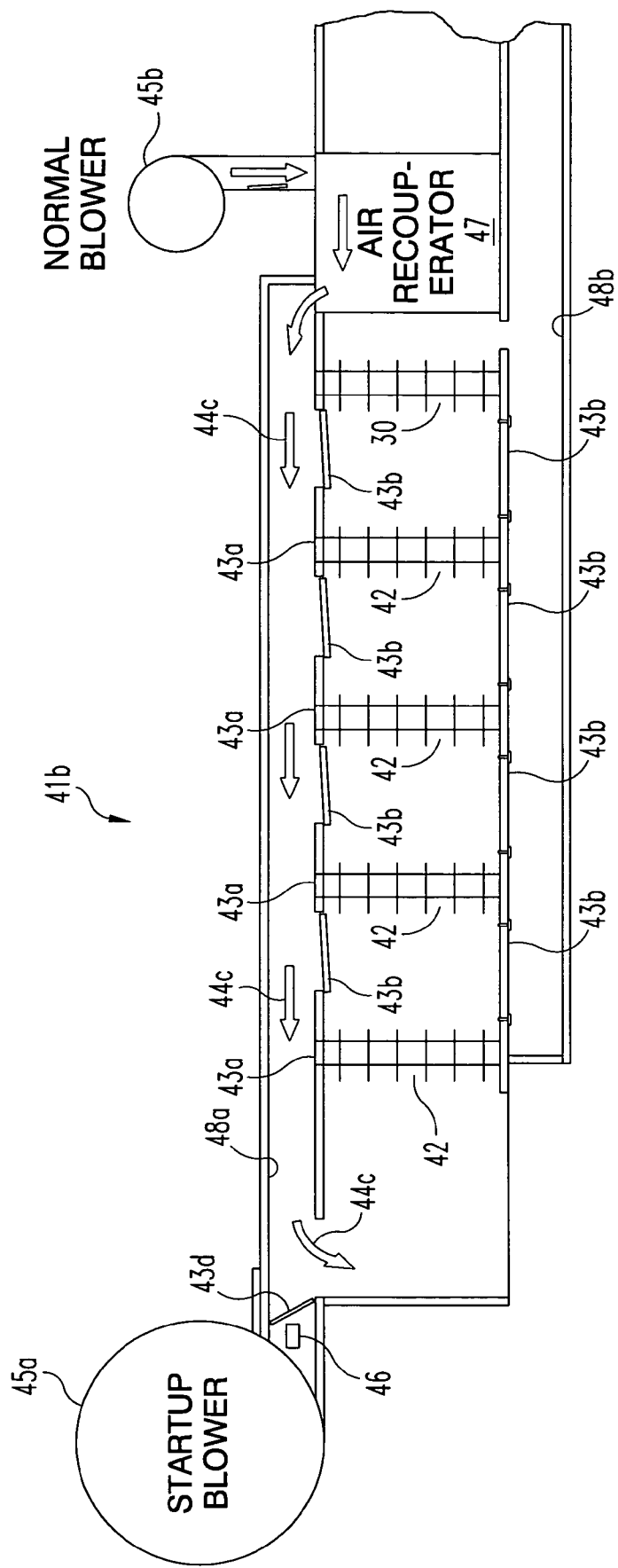

In some applications, such as fuel-cell based vehicles, a relatively rapid start-up of reactor 40 typically would be desired. Referring to FIGS. 3 and 4, one arrangement including steam reformer reactor 40 is diagrammatically shown that includes multiple devices 42 with baffles 43a and dampers 43b to direct heat exchange fluid flow. Heat exchange fluid is pressurized by start-up blower 45a or sustaining blower 45b as further explained hereinafter. Also included is start-up combustor 46, recuperative heat exchanger 47, vaporizer 30, blower damper 43c, and blower damper 43d. Heat exchange fluid flows along arrows 44b and 44c in FIGS. 3 and 4, respectively, and reformate flows perpendicular to the view plane of FIGS. 3 and 4.

More specifically, FIG. 3 depicts start-up configuration 41a in which dampers 43b are positioned in cooperation with baffles 43a to direct heat exchange fluid from top plenum 48a to bottom plenum 48b and through each device 42 in a parallel fashion. For this arrangement, blower damper 43c is closed and blower damper 43d is open. With configuration 41a, hydrocarbon fuel is burned with air using start-up combustor 46 and a relatively high flow rate generated with start-up blower 45a. This high-flow combustion gas passes through devices 42 in parallel and then to vaporizer 30 and combustion air recuperative heat exchanger 47. Once the reaction temperature is reached, blower damper 43c is opened, blower damper 43d is closed, and dampers 43b are repositioned relative to baffles 43a to force a smaller quantity of air through devices 42 in series for sustained operation as shown in configuration 41b of FIG. 4. In this case, blower 45b is utilized to provide a relatively lower flow compared to start-up blower 45a to improve efficiency during sustained operation at temperature. Incremental additions of hydrogen gas between devices 42 can be utilized to maintain temperature, as desired. Nonetheless, in other embodiments, more or fewer devices 42 may be used, reactor 40 or device 42 may be configured differently, vaporizer 30 may operate independent of reactor heat exchange fluid, different pressurization/blower arrangements may be used, and/or a different heat source may be employed for start-up or sustained operation.

Referring back to FIG. 1, reformate products are supplied from steam reformer reactor 40 to WGS reactor 100. While the steam reforming reaction typically is operated at more than 650° C. and is endothermic, the water-gas shift reaction typically operates at less than 400° C. and is mildly exothermic. The WGS reaction is provided as reaction (2) as follows:

$$CO + H_2O \leftrightarrow H_2 + CO_2 \qquad (2)$$

This reaction is controlled to increase the hydrogen content of the product stream for steam reforming and to decrease the CO concentration. Reaction (2) is equilibrium limited, and operation below 270° C. is typically desirable for vehicle fuel-cell applications. As a result, the reaction kinetics are generally slower than desired.

Figure 5:
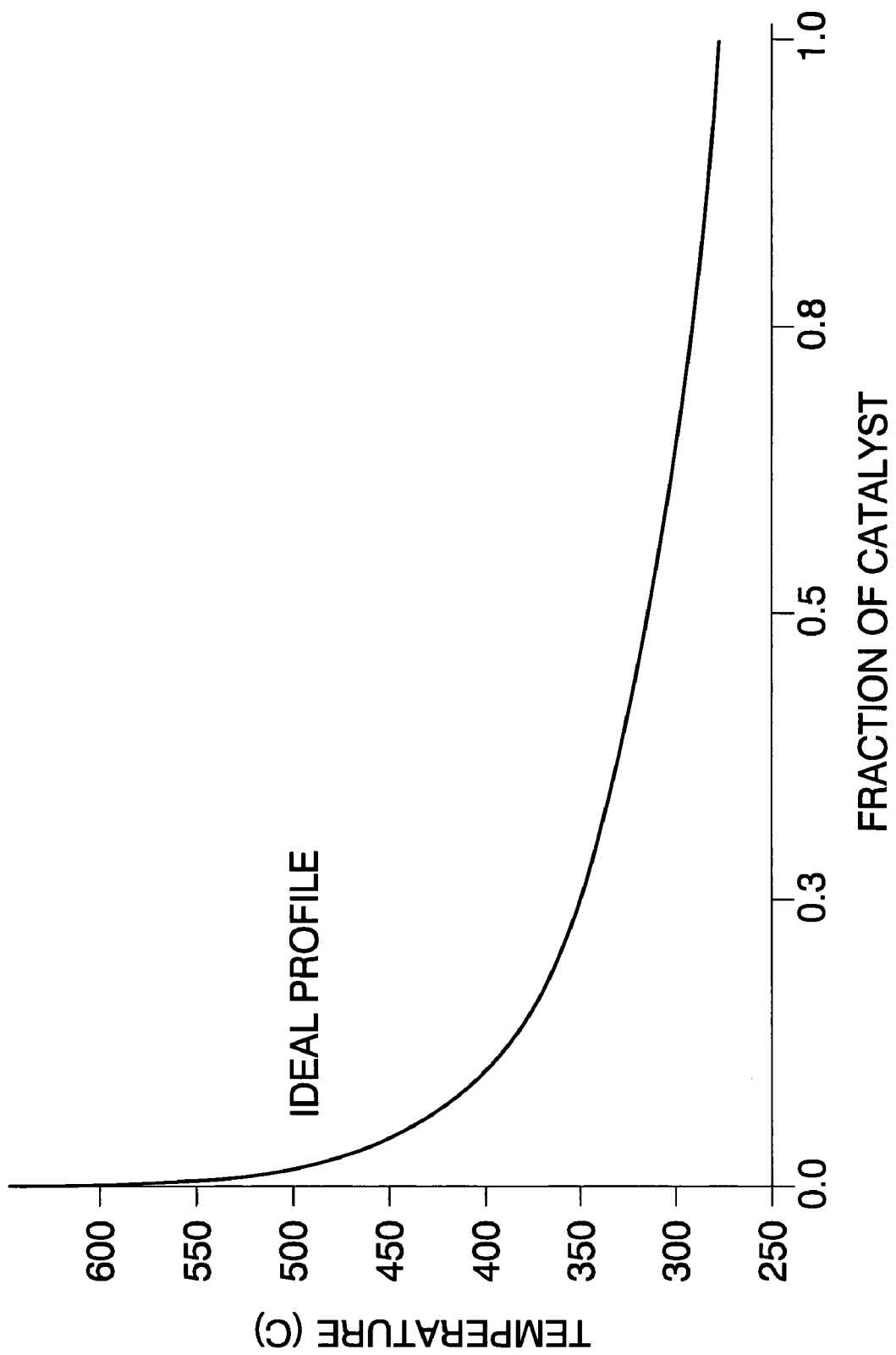
FIG. 5 is a graph of an ideal temperature profile for a Water-Gas Shift (WGS) reaction.

Typically, the ideal temperature profile along the flow path of reactants through a WGS reactor is shown in FIG. 5. This profile seeks to maximize reaction rate as the reaction proceeds by balancing reaction kinetics which are faster at higher temperatures and equilibrium which is favored at lower temperatures. Therefore, there exists an optimal temperature for maximum reaction rate at a given fluid composition. In conventional schemes, a two-stage adiabatic reactor with a heat exchanger has been utilized to approximate this profile with most of the conversion, approximately 82%, occurring in the first third of the reactor, and the remaining approximately 8% of conversion occurring along the remaining two-thirds of the reactor. It should be appreciated that the ideal temperature profile of FIG. 5 indicates are relatively rapid decrease in temperature—from 665° C. at the inlet to 400° C. at eight percent of the reactor catalyst. The corresponding reactor zone is also where two-thirds of the heat of reaction is being generated, adding to the unbalanced heat load at the inlet end of the reactor. Consequently, it is no surprise that standard reactor configurations have fallen short of the ideal profile.

Figure 6:
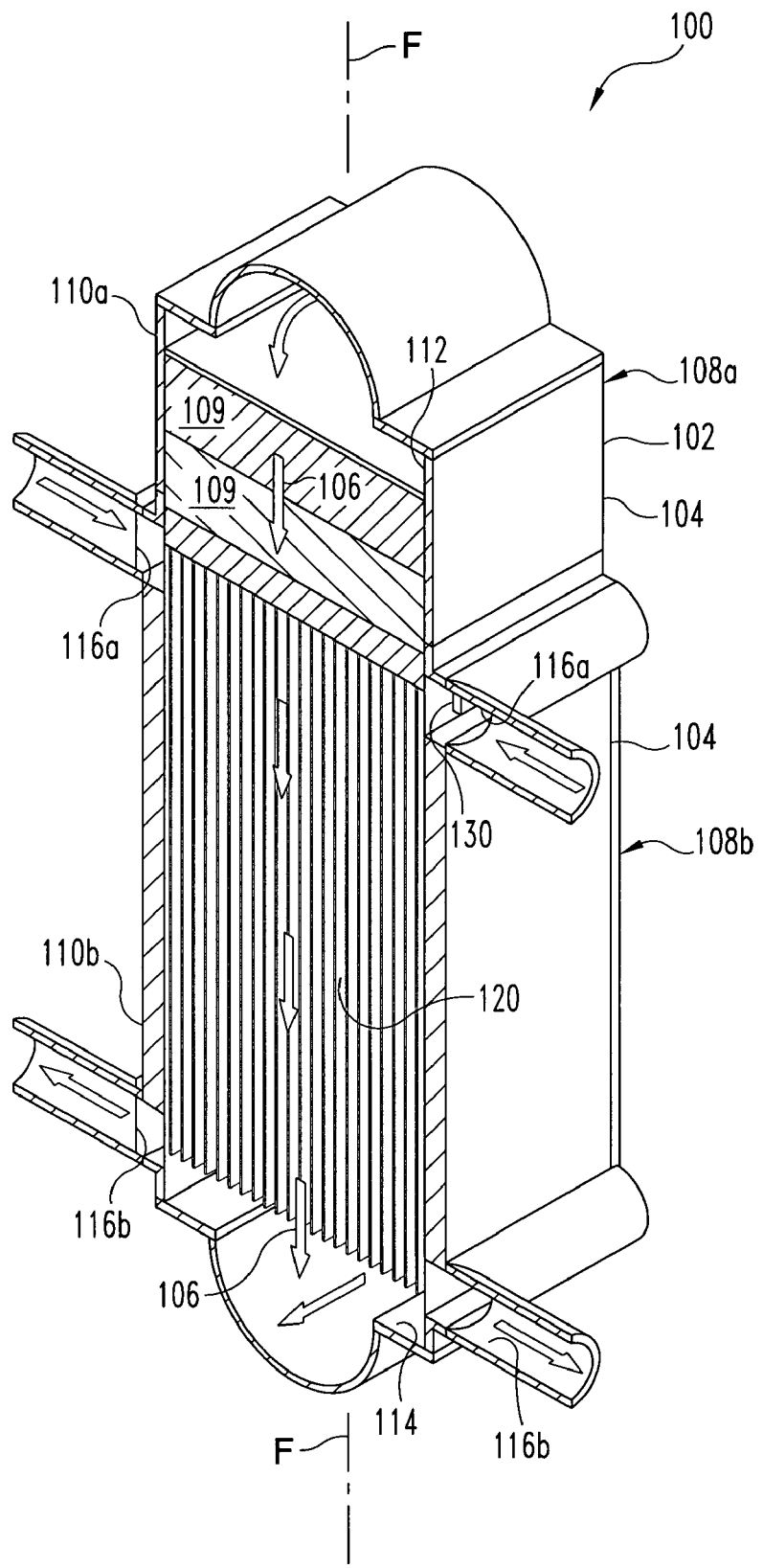
FIG. 6 is a perspective, partial sectional view of one half of a WGS reactor of FIG. 1, the other half being a mirror image about the sectional plane.

WGS reactor 100 includes microchannel device 102. Compared to standard WGS reactors, microchannel device 102 more effectively removes heat to balance equilibrium conversion and kinetics, while reducing size of the reactor and operating desirably without a separate heat exchanger. As illustrated in FIG. 6, microchannel device 102 includes different zones 104 relative to the reactant/product flow path through device 102, as directionally indicated by arrow 106. These zones 104 are implemented with adiabatic section 108a at the front end portion 110a of device 102 and temperature differential section 108b at the back end portion 110b of device 102. In one implementation of device 102, the exothermic reaction in adiabatic section 108a heats the feed gas from about 340 to about 410° C.; and this feed gas stream then enters differential temperature section 108b where it is cooled from approximately 410° C. down to about 275° C. as the reaction progresses.

Figure 7:
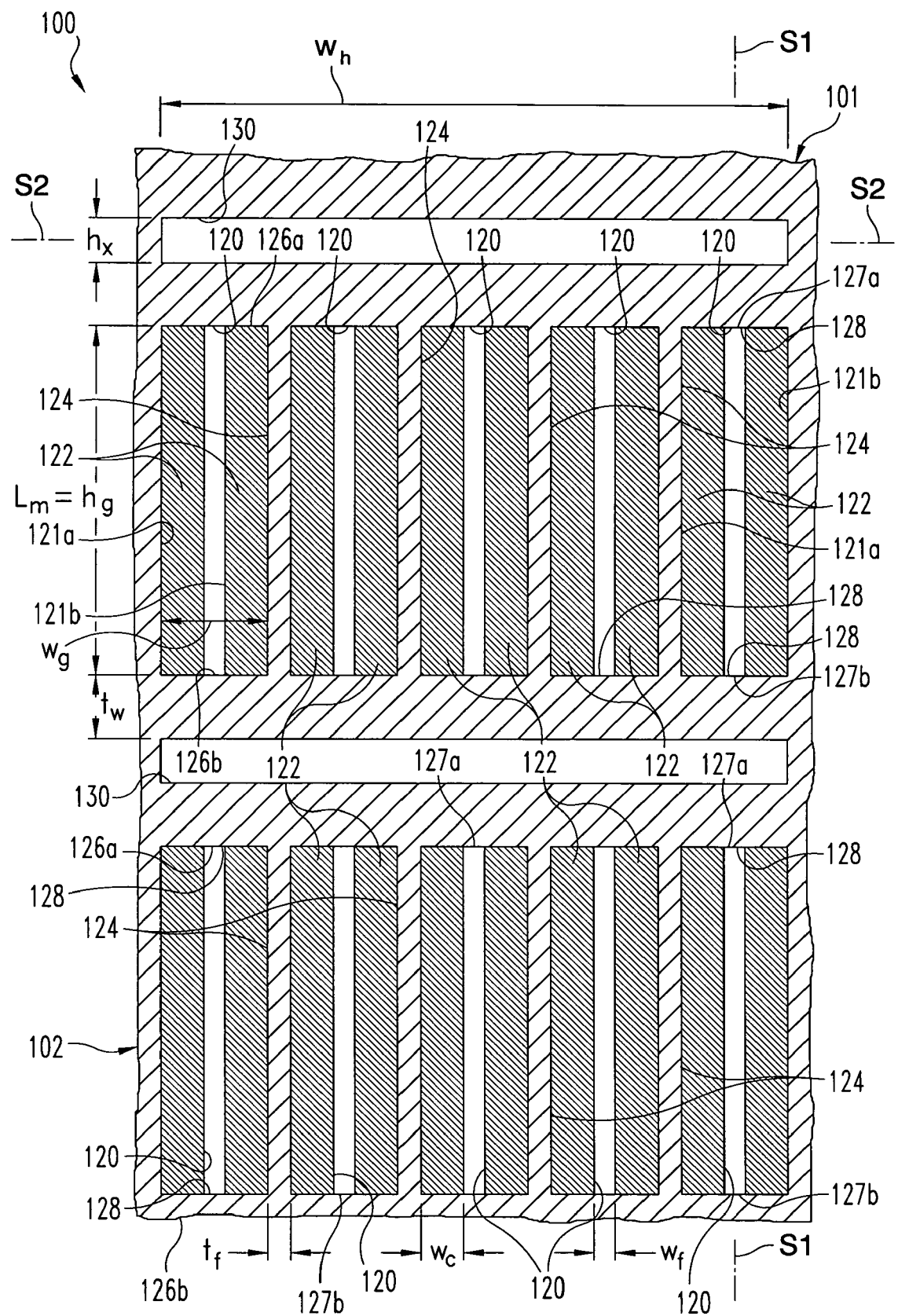
FIG. 7 is a partial diagrammatic, sectional view of a portion of the reactor of FIG. 6.

Reactants are supplied to adiabatic section 108a through inlet 112 of device 102. Adiabatic section 108a includes catalyst monoliths 109 in the form of metal foams coated with catalyst material. From adiabatic section 108a, the reaction gas continues along the flow path in the direction indicated by arrows 106 into differential section 108b. Arrows 106 are parallel to flow axis F-F. Product from device 102 exits through outlet 114. Referring additionally to FIG. 7, a schematic cross section 101 of a portion of differential section 108b is shown that is taken along the flow path such that the view plane of FIG. 7 is perpendicular to the reactant flow path along arrows 106. Within differential section 108b, the reaction gas is distributed through a number of reaction microchannels 120 extending along flow axis F-F. Each microchannel 120 is lined on opposite sides 121a and 121b with catalyst material 122. This catalyst material 122 may be a pure catalyzing agent or provided on or in a matrix that is neutral with respect to performance of reaction (2). Microchannels 120 are each separated from one another by a respective one of a number of thermally conductive fins 124 extending between thermally conductive walls 126a and 126b. Walls 126a and 126b define boundaries or margins 128 of each microchannel 120 at opposing microchannel ends 127a and 127b. Fins 124 are connected to walls 126a and 126b to provide a low resistance to heat exchange, and typically are integrally formed together from a metal with suitable thermal properties. It should be appreciated that not all like features in FIGS. 6 and 7 are specifically designated by reference numbers to preserve clarity.

Correspondingly, walls 126a and 126b collectively bound heat exchange microchannels 130. Microchannels 130 are oriented for co-current or counter-current flow of a heat exchange fluid relative to the direction of flow through microchannels 120 along axis F-F. As shown in FIG. 6 for co-current flow, heat exchange fluid enters device 102 through inlets 116a and exits though outlets 116b. Microchannels 120 each have a sectional height dimension hg that represents a microchannel gap height along cross section 101 of FIG. 7. This gap height dimension is parallel to and oriented in the same direction as axis S1-S1, is alternatively designated $L_m$, and is generally the same as the height of each fin 124 for the depicted arrangement.

Microchannels 120 each have a sectional width dimension $w_g$ that represents a microchannel gap width between corresponding fins 124. Accordingly, this microchannel gap width includes catalyst material 122 and/or any other structure positioned in microchannel 120 between the spaced apart fins defining such microchannel. In contrast, catalyst material width $w_c$ and flow channel width $w_f$ represent the width of catalyst material 122 in microchannel 120 and the width of the open flow channel slot in microchannel 120, respectively, such that $w_g = 2w_c + w_f$. The microchannel gap width dimension $w_g$ is parallel to and oriented in the same direction as axis S2-S2.

Each microchannel 120 is separated from microchannel 130 by wall 126a and/or 126b with a thickness of $t_w$ in a direction parallel to axis S1-S1. Microchannels 130 each have a maximum width dimension $w_h$ along cross section 101 parallel to axis S2-S2 and a maximum height dimension $h_x$ along cross section 101 parallel to axis S1-S1. Fin thickness is indicated as $t_f$ along a direction parallel to axis S2-S2. Notably axes F-F, S1-S1, and S2-S2 are orthogonal relative to one another.

It has been found that the co-current flow of microchannels 120 and 130 relative to one another and heat transfer characteristics of this structure can be used to provide an asymptotic temperature profile that approaches the ideal profile of FIG. 5.

Device 102 further provides structures to provide a greater volume of catalyst than other reactor arrangements for WGS reactions. In one example, the catalyst accounted for more than half (52%) of the total volume of device 102.

Referring back to FIG. 1, system 20 utilizes Preferential Oxidation (PROX) reactor 200 to further reduce CO content provided to fuel cell 60. In this reaction, a near stoichiometric amount of air is added to the WGS reactor synthesis gas and the CO is oxidized while the larger concentration of $H_2$ is not oxidized, as represented by reaction (3) that follows:

$$CO + \tfrac{1}{2}O_2 \rightarrow CO_2 \tag{3}$$

In this reaction the molecular hydrogen and CO compete for oxidation with temperature impacting the relative balance. The optimal reaction temperature depends on the catalyst utilized, among other things.

For the application of system 20 to a fuel cell based vehicle, one embodiment generates about a 1% CO product from the WGS reaction and produces an outlet CO concentration of less than 10 ppm using an $O_2$:CO ratio of 1:1 or less from PROX reactor 200. This fluid stream can then be used to feed a standard Proton Exchange Membrane (PEM) of fuel cell 60 without appreciably degrading it. For this transportation application, it also can be desirable to reduce the size and weight of reactor 200. Appropriate temperature control of this highly exothermic reaction is generally desired for this and many other applications, although in still others it may not be of concern. Reactor 200 controls temperature of reaction (3) by applying microchannel heat exchangers.

Figure 8:
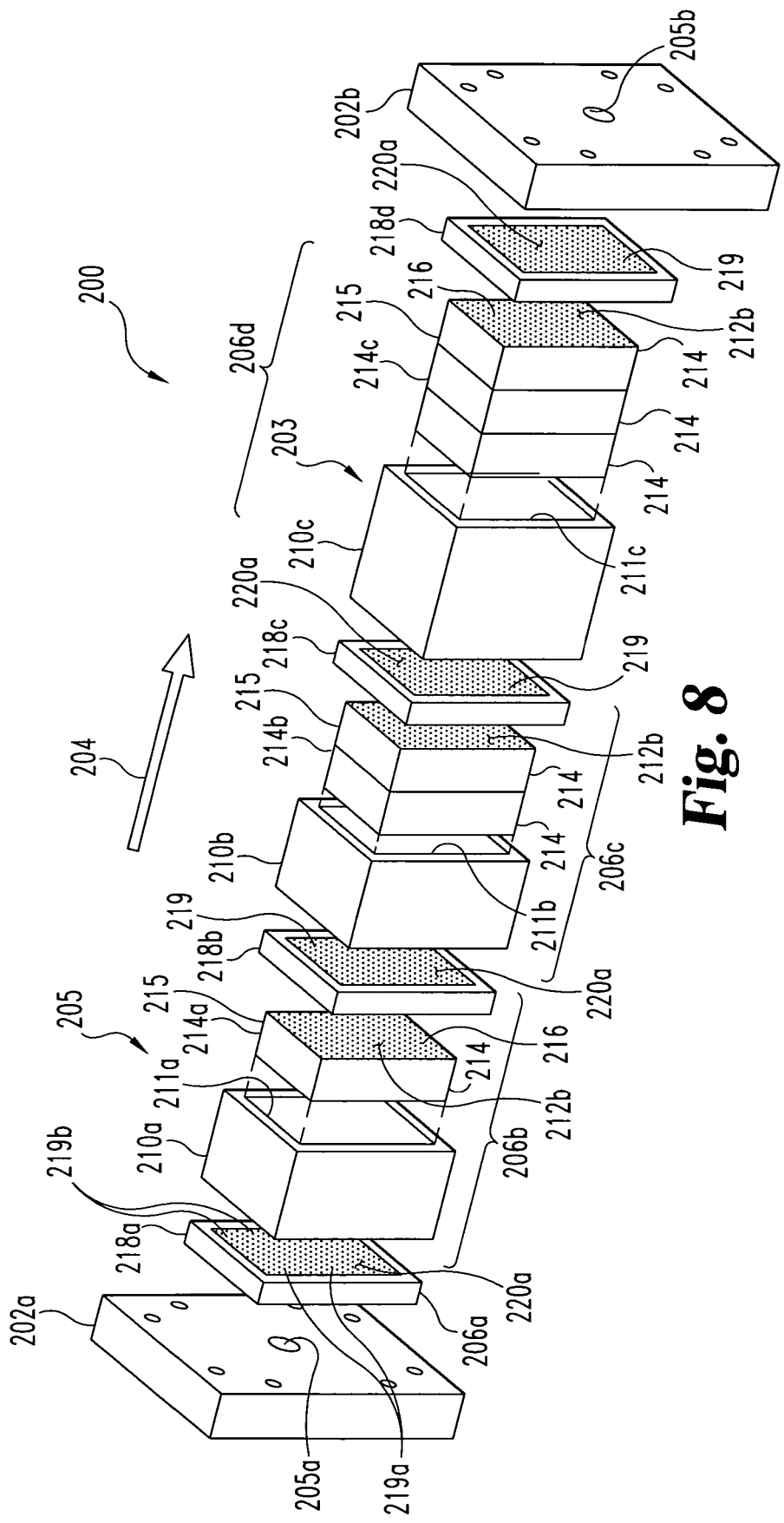
FIG. 8 is a perspective, diagrammatic assembly view of a Preferred Oxidation Reaction (PROX) reactor of FIG. 1.
Figure 17:
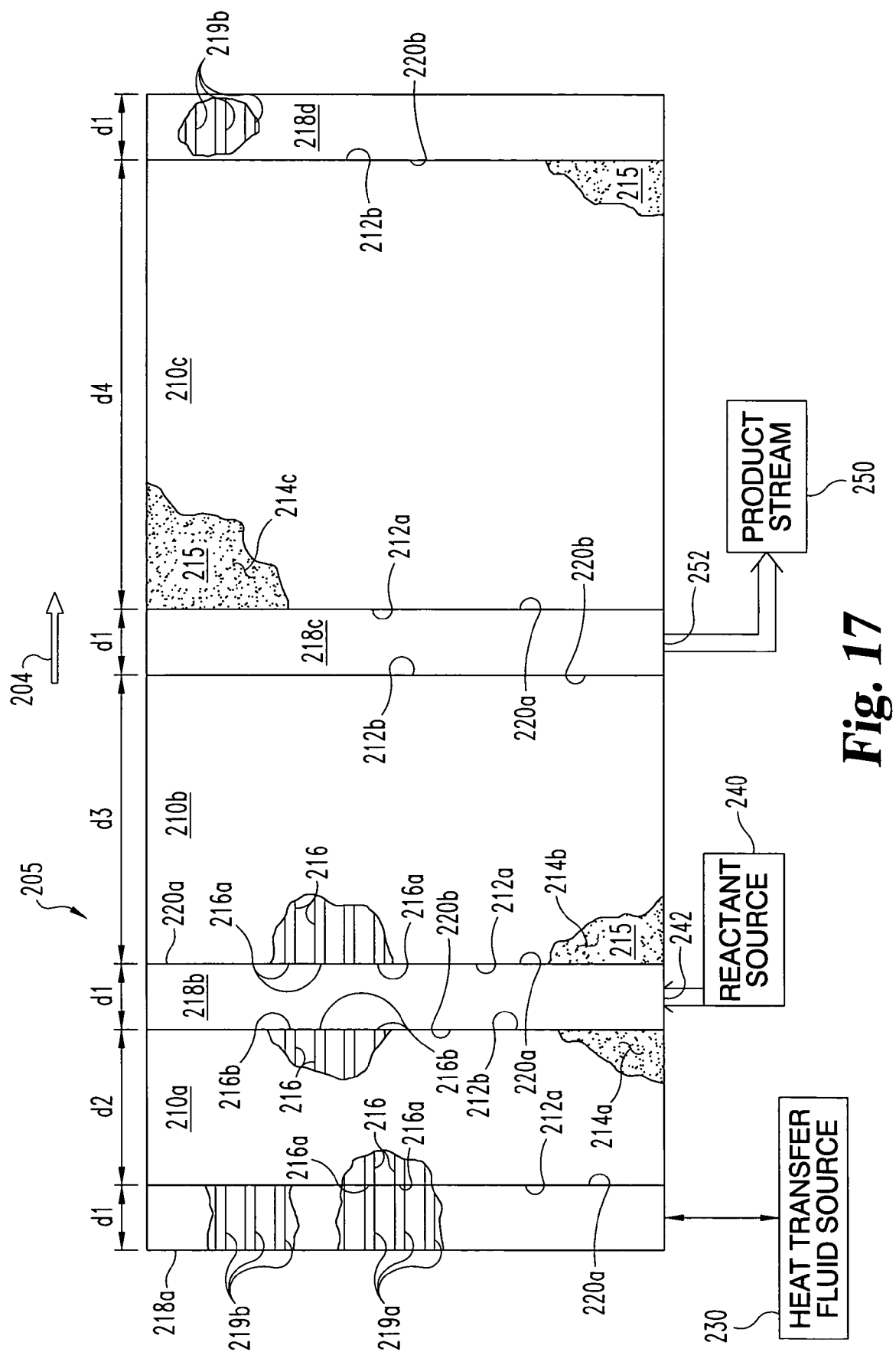
FIG. 17 is a partial cutaway, diagrammatic side view of the reactor shown in FIG. 8.

Referring additionally to FIGS. 8 and 17, reactor 200 is illustrated; however, not all like features are designated by reference numerals to preserve clarity. FIG. 8 shows reactor 200 in a perspective, partially diagrammatic assembly view. Reactor 200 includes opposing end plates 202a and 202b with stack 203 positioned therebetween to provide a multistage reaction device 205. Device 205 processes fluid flowing in the direction indicated by arrow 204 therethrough. Device 205 receives reactant fluid through an inlet aperture 205a through end plate 202a, which is schematically represented. This fluid reactant stream first encounters microchannel heat exchanger 218a at front end 206a of the process to provide a desired reactant temperature.

Heat exchanger 218a includes a number of process microchannels 219a through which the reactant stream flows during operation of reactor 200 in the direction indicated by arrow 204 (See FIG. 17). Heat exchanger 218a also includes a number of heat transfer microchannels 219b that are thermally coupled to process microchannels 219a with a low thermal resistance to facilitate thermal conduction therebetween. Microchannels 219b receive a heat transfer fluid therethrough to regulate temperature of the reactant through this coupling. A heat transfer fluid source 230 is schematically shown in FIG. 17 for heat exchanger 218a. Microchannels 219a and 219b are also collectively designated heat exchange microchannels 219.

From heat exchanger 218a of front end 206a, initial processing stage 206b is encountered which includes reactor housing 210a that defines reaction chamber 211a. Catalyzing structure 214a is positioned within chamber 211a. Housing 211a surrounds structure 214a to contain/confine fluid being processed therewith. Catalyzing structure 214a includes catalyst material 214 to enhance the PROX reaction performed with the reactant fluid from heat exchanger 218a. Catalyst material 214 includes support material 215 that defines a number of microchannel fluid processing passageways 216 therethrough. Support material 215 carries one or more PROX-enhancing catalysts.

Passageways 216 each include inlet 216a to receive fluid for processing and outlet 216b to output fluid after processing. It should be appreciated that passageways 216 may intersect one another and may branch. Correspondingly, passageways 216 can be arranged such that each one only has one inlet 216a and one outlet 216b, can branch to have more inlets 216a than outlets 216b or more outlets 216b than inlets 216a, or a combination of these. Further passageways 216 can differ in size, length, orientation, shape, and the like. In one embodiment, passageways 216 are provided as a network of intersecting pores through a monolithic block that interconnect many different inlets 216a and outlets 216b. In one particular implementation, catalyst material 214 was provided in the form of a porous monolith with support material 215 being a block of copper foam.

Catalyzing structure 214a defines process fluid inlet face 212a that abuts outlet face 220a of microchannel heat exchanger 218a to form a low resistance thermal interface. Accordingly, heat exchanger 218a can also be used, at least in part, to regulate temperature of structure 214a. Face 212a of catalyzing structure 214a defines at least some of inlets 216a of passageways 216. Opposite face 212a, structure 214a defines fluid outlet face 212b, which in turn defines at least some of outlets 216b of passageways 216. Immediately downstream of catalyzing structure 214a is microchannel heat exchanger 218b, which is also included in stage 206b. Heat exchanger 218b defines inlet face 220b that abuts face 212b of structure 214a to form a thermal interface therewith and further regulate temperature. Heat exchanger 218b includes process microchannels 219a to receive fluid output by structure 214a, and heat transfer microchannels 219b each thermally coupled to one or more of microchannels 219a as described in connection with heat exchanger 218a. Heat exchanger 218b may be coupled to source 230 and/or a different heat transfer fluid source. Likewise, heat exchanger 218b defines an outlet face 220a opposite inlet face 220b.

Fluid flows along arrow 204 from stage 206b into intermediate processing stage 206c. Stage 206c includes reactor housing 210b defining reaction chamber 211b that houses catalyzing structure 214b. Catalyzing structure 214b is comprised of two blocks of catalyzing material 214, having approximately twice the volume of catalyzing structure 214a. Catalyst material 214 includes support material 215 defining a number of passageways 216 with corresponding inlets 216a and outlets 216b. At least a portion of inlets 216a are defined by process fluid inlet face 212a and at least a portion of outlets 216b are defined by process fluid outlet face 212b. Microchannel heat exchanger 218c concludes stage 206c, and includes inlet face 220b in low resistance thermal contact with face 212b of structure 214b and outlet face 220a opposite face 220b. Heat exchanger 218c includes process microchannels 219a and heat transfer microchannels 219b configured the same as heat exchangers 218a and 218b, and can use the same or a different heat transfer fluid source (not shown).

Process fluid is output from intermediate processing stage 206c to enter end stage 206d. Stage 206d includes reactor housing 210c that defines reaction chamber 211. Chamber 211c contains catalyzing structure 214c. catalyzing structure 214c is comprised of three blocks of catalyst material 214, which is about three times the volume of catalyst material in structure 214a, but is otherwise configured the same with support material 215, passageways 216, inlets 216a, outlets 216b, face 212a, and face 212b. Stage 206d ends with heat exchanger 218d configured the same as heat exchanger 218a- including outlet face 220a opposite inlet face 220b. Face 212a of structure 214c abuts face 220a of heat exchanger 218c and face 212b of structure 214c abuts face 220b of heat exchanger 218d. Heat exchanger 218d can utilize the same or a different heat transfer fluid source relative to heat exchangers 218a, 218b, 218c, and 218d.

From stage 206d, reaction product is output through aperture 205b of end plate 202b that results from the upstream catalytic processing in stages 206b, 206c, and 206d. For the PROX reaction, the product is a molecular hydrogen stream provided fuel cell 60 with a lower CO concentration than was input to device 205. Referring specifically to FIG. 17, heat exchanger 218b is further configured with one or more ports 242 in fluid communication with reactant source 240 to add reactant upstream of structure 214b. More particularly, heat exchanger 218b can be further configured as a fluid mixer. Furthermore, heat exchanger 218c includes at least one port 252 to receive product or otherwise divert a portion of the process fluid stream, routing it away from structure 214c and reactor 200. Port, 252 is in fluid communication with product stream conduit 250. Product separation can be performed by any standard process. Heat exchangers 218a, 218b, 218c, and 218b (collectively heat exchangers 218) can be of any type. Commonly owned International Patent Application No. PCT/US2004/015402 filed May 17, 2004 (International Publication No. WO 2004/104140) provides further background regarding microchannel heat exchangers and mixers.

In one arrangement, each block of catalyst material 214 is comprised of a catalyst coated copper foam material with 60 pores per inch. Because of the contact between the catalyst foam and the heat exchanger panel, heat generated by the strongly exothermic PROX reaction is transferred both by convection through the gases and conduction through the foam to the corresponding heat exchanger(s) 218. To further control the reaction and maintain an isothermal temperature profile, air is added in selected small quantities at each of the stages (corresponding to the arrangement of reactant source 240), rather than once at the beginning. It has been found that reactor 200 can have more than 50% of its total volume occupied by catalyst material while acceptably controlling reaction temperature. For one form of reactor 200 that was developed, the catalyst material accounted for nearly 70% of the reactor volume (excluding outside walls and headers).

At the front end of device 205 in stage 206b, where most of the reaction is occurring and thus most of the heat is generated, less catalyst can be used and the heat exchangers can be closer together. Further downstream more catalyst can be used with fewer heat exchangers. In other embodiments directed to a PROX or non-PROX application, multiple devices 205 can be used; more or fewer stages can be utilized in the device; reactant(s) may be introduced between one or more processing stages; product(s) can be removed before the final processing stage; different catalyst types or amounts may be used with different stages, more or fewer heat exchangers; different heat exchanger types, and/or device 205 or its variants can be utilized to perform an endothermic reaction. Alternatively or additionally, one or more of structures 214a, 214b, and 214c can include one or more catalysts that are different from those of one or more other of the structures. In one particular embodiment, an additional stage was utilized and the first three stages used a different catalyst than the last stage.

As illustrated in FIG. 17, heat exchangers 218 each have a process flow path from face 220b to face 220a of distance d1. Structures 214a, 214b, and 214c have different process flow distances of d2, d3, and d4, respectively. It should be appreciated that d2 is preferably at least 50% greater than d1. More preferably, d2, d3, and d4 are greater than d1. Even more preferably d3 is greater than d2, and still more preferably d3 is greater than d4. This dimensional arrangement corresponds to more catalyzing surface area with each downstream stage to provide better conversion results as the relative reactant amount changes. The application of a relatively thin panel microchannel heat exchanger generally provides a lower pressure drop, and has a smaller volume subject to temperature control, relative to other types of heat exchangers. Nonetheless, in other forms, a different type of heat exchanger may be utilized.

The product from reactor 200 is provided to fuel cell 60 to generate electric power in a standard manner. From fuel cell 60, anode exhaust gas is provided to combustor 50 along with air to generate heat for vaporizer 30 and reactor 40, as previously described. Water from electric power generation with fuel cell 60 is condensed by condenser 70 which provides condensed water to vaporizer 30 and expels cathode exhaust gas as shown in FIG. 1.

Figure 9:
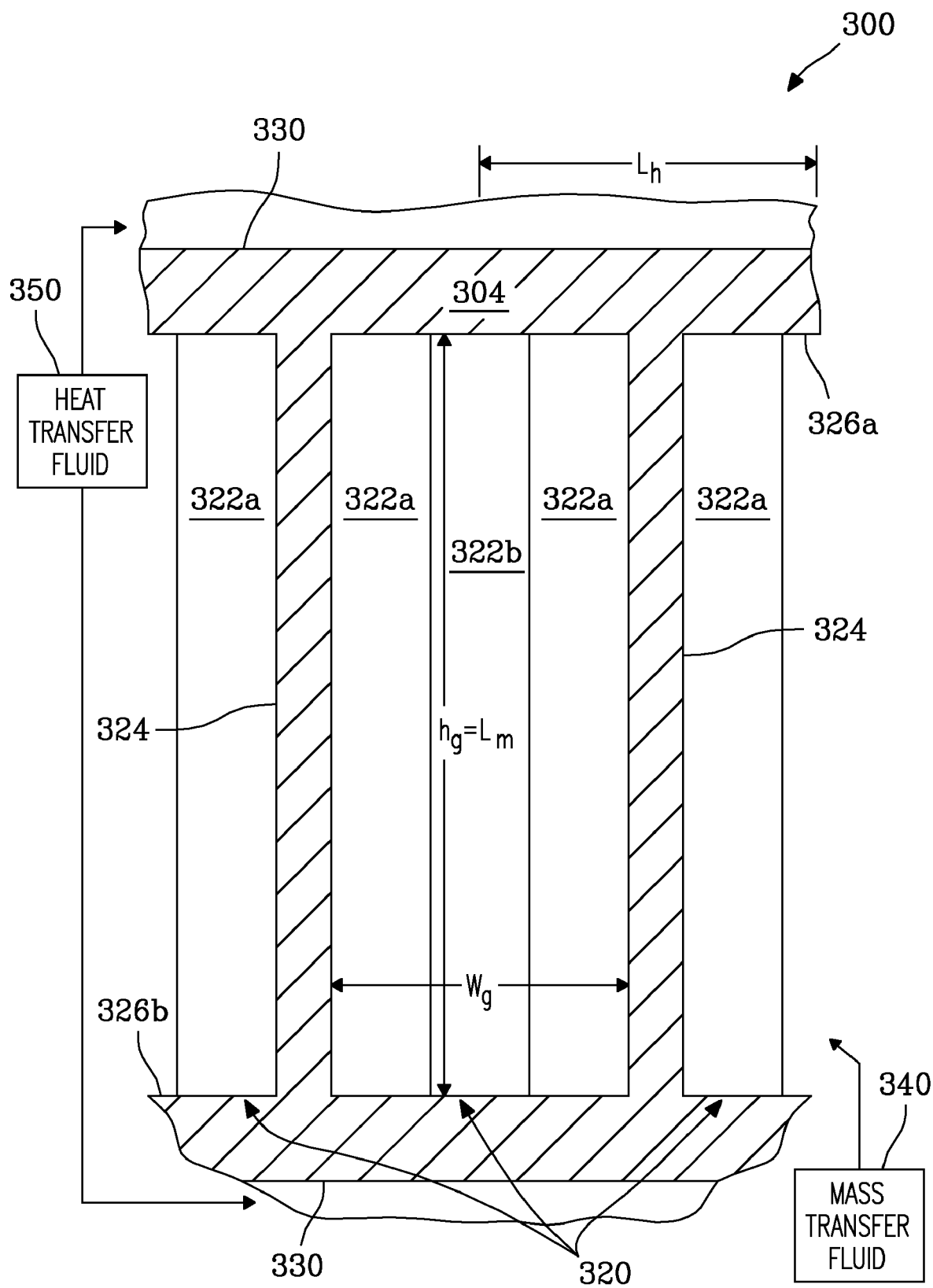
FIG. 9 is a partial, diagrammatic and sectional view of a microchannel device for performing a mass transfer between two media.

It has been discovered that the microchannel structure of device 102 can be desired for other applications and reactor designs. For example, such structure provides unique techniques to perform mass transfer processes that occur at a liquid/gas interface, chemical separations, and other catalytic or noncatalytic reactions besides the WGS reaction. Referring to FIG. 9, microchannel device 300 is illustrated that has mass transfer microchannels 320 and heat transfer microchannels 330 similar to microchannels 120 and 130 of device 102 shown in FIGS. 6 and 7. In both devices 102 and 300, an extended surface area structure is utilized, as more specifically designated by reference numeral 304 in FIG. 9.

A fluid subject to mass transfer flows through mass transfer microchannels 320 perpendicular to the view plane of FIG. 9. This mass transfer fluid is provided from mass transfer fluid source 340, which is schematically represented in FIG. 9. A heat transfer fluid flows through heat transfer microchannels 330 co-current, counter-current, or cross-current to the flow of fluid through mass transfer microchannels 320. Heat transfer fluid is provided from heat transfer fluid source 350, which is schematically shown in FIG. 9.

Structure 304 includes thermally conductive fin 324 integrally connected to thermally conductive walls 326a and 326b. Correspondingly, fin 324 separates mass transfer microchannels 320 from one another, and walls 326a and 326b separate mass transfer microchannels 420 from heat transfer microchannels 430. Fin 324 and walls 326a and 326b are typically formed from metal.

Structure 304 addresses both mass transfer and heat transfer considerations pertinent to a variety of processes. The physical processes where such structure could be applied are broad, including chemical reactions and other mass transfer processes, such as chemical separations. More than one physical process can also be occurring in sequence or in parallel, such as with catalytic distillation. Fin 324 of structure 304 can be arranged to provide a lower resistance to heat transfer to or from the physical process relative to wall 326a and/or 326b, which can reduce occurrence of hot spots and cold spots for exothermic and endothermic reactions, respectively. Alternatively or additionally, with proper relative dimensioning of fin 324, heat collection or distribution can be increased relative to the physical process as compared to thermal conduction through wall 326a and/or 326b.

Fin 324 can also support extended area for mass transfer processes between different media 322a and 322b in microchannel 320 as illustrated in FIG. 9. Media 322a is in closer thermal contact with fin 324 than media 322b. In turn, fin 324 is thermally coupled to microchannels 330 by a low thermal resistance through walls 326a and 326b. Media 322a or 322b could be comprised of a solid, a liquid, a gas, or multiple phases, such as a fluid in a porous catalyst material. The mass transfer between media 322a and 322b could support a heterogeneous chemical reaction in one of the media. Other examples include chemical separations, such as gas absorption, adsorption, desorption, condensation, or distillation.

For a given microchannel 320, the primary area for heat transfer is proportional to $L_h$, while the area for mass transfer is proportional to $2L_m$. Although the areas are geometrically related, structure 304 provides additional design variables that significantly decouple the heat transfer and mass transfer areas. Structure 304 can be repeated many times to provide a microchannel device with a desired mass transfer characteristic and desired heat transfer characteristic, a few of which are shown in cross section 101 of device 102 in FIG. 7. The geometric repetition of such structures is consistent with the layering of microchannels to achieve capacity desired for a given application, such as device 102.

In this and other reactions, mass transfer of reactants and products occurs between the two media, and heat is generated or consumed by exothermic or endothermic reactions, respectively. For the exothermic case, heat is transferred to fins, through the wall, and to a coolant flowing through the heat transfer channels. Heat flows through the opposite pathway for the endothermic case. In addition, the reactant fluid can be progressively heated or cooled as it flows through the mass transfer microchannels to establish a desired temperature profile. The flow direction of the reactant fluid relative to the flow direction of the heat exchange fluid can be counter-current, co-current, or cross-current. In the case of structure 304, microchannels 320 and 330 are layered orthogonal to one another.

The decoupling of mass transfer and primary heat transfer area facilitates design of an ratio of mass transfer area to primary heat transfer area that desirably differs from the standard 1:1 ratio common to existing layered configurations. With reference to device 102 of FIG. 7, the ratio of mass transfer area, $A_m$, to primary heat transfer area, $A_m$, is given by expression (1) as follows:

$$\frac{A_m}{A_h} = \frac{w_c}{h_f + 2h_c + t_f}; \quad (1)$$

By increasing the aspect ratio of the fins, $A_m/A_h$ can be made arbitrarily greater than 1. The use of microchannels in conjunction with such fins provides acceptable fin heat transfer efficiency, and a ratio of mass to heat transfer ratio significantly greater than 1. The presence of four independent design variables in the area ratio expression above provides for flexibility in decoupling the mass transfer area from the heat transfer area in designing the device as described above. This concept is applicable for any number of configurations of the heat transfer channels. These channels may or may not be microchannels depending on the specific design. Additionally or alternatively, extended surface area structures, including fins, can be added in the heat transfer channels to provide a target ratio of less than one.

Pressure drop is another consideration in designing microchannel reactors. The flow area for the reactant fluid can be increased over the standard layered approach without increasing the hydraulic radius by increasing flow channel length, $L_m$, without increasing flow channel width, $w_f$. Thus, when desired, pressure drop can be controlled with or without control of heat and mass transfer characteristics. Alternatively or additionally, extended area structures, such as fins 324, can also be used as structural support members of the device.

In one example, structure 304 with extended surface area provided by fin 324 or the like is applicable to relatively narrow target ranges for reaction temperature, such as might be desired to obtain high conversion and/or good selectivity. Some catalysts for the PROX reaction can entail target temperature ranges of less than 10° C. based on certain conditions. In another example, establishing a temperature profile down the length of a reactor can be aided by inclusion of structures with extended surface area—such as that previously described in connection with device 102.

Figure 10:
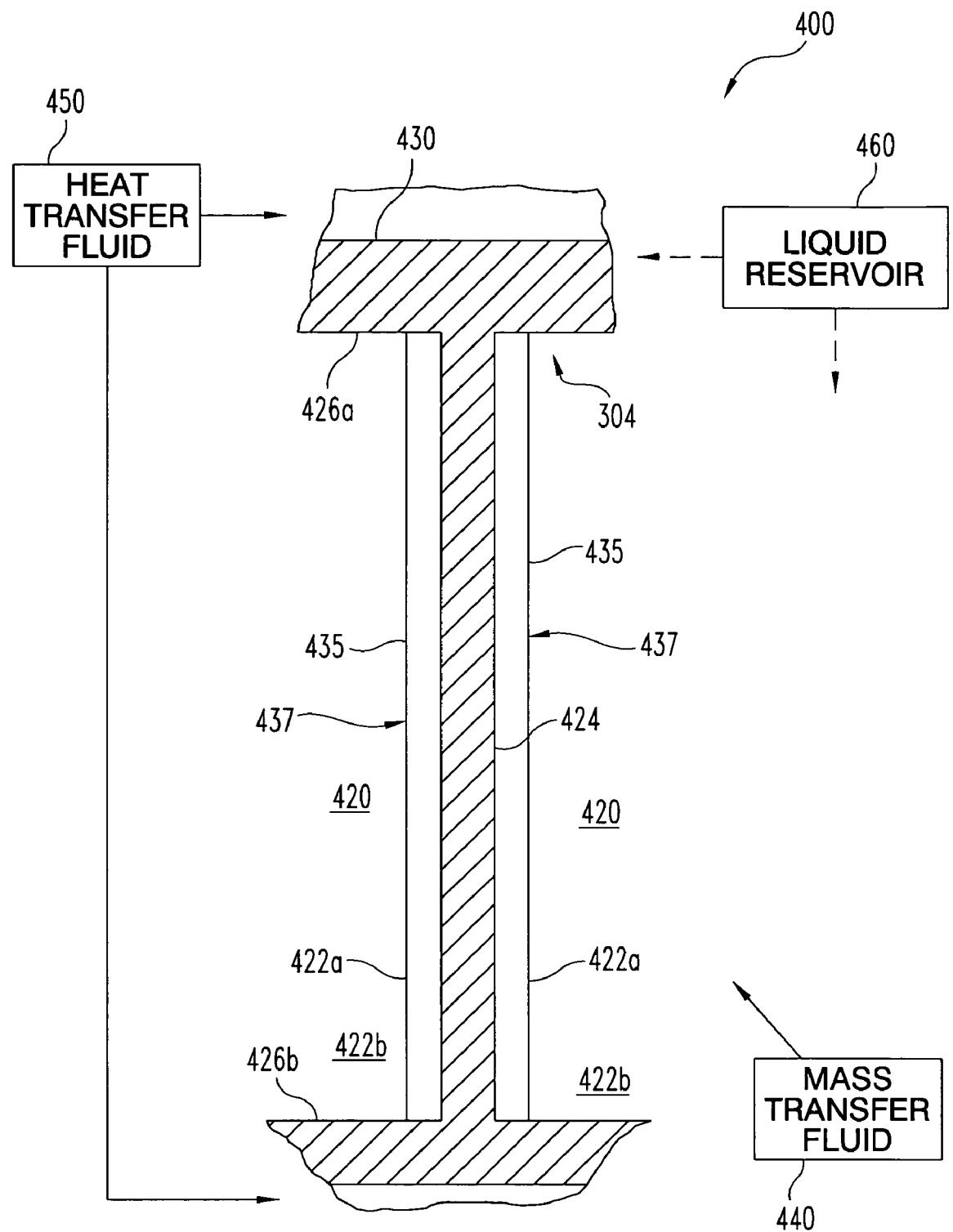
FIG. 10 is a partial, diagrammatic and sectional view of a microchannel device for performing a mass transfer process at a liquid-gas interface.

Referring additionally to FIG. 10, applications directed to a mass transfer process between liquid and gas, for example at a liquid/gas interface, are further described in connection with the partial sectional view of device 400; where like reference numerals refer to like features previously described. Device 400 includes structure 304 implemented in the form of thermally conductive fin 424 integrally connected to thermally conductive walls 426a and 426b. Correspondingly, fin 424 separates mass transfer microchannels 420, and walls 426a and 426b separate mass transfer microchannels 420 from heat transfer microchannels 430. Fin 424 and walls 426a and 426b are typically formed from a metal. Mass transfer fluid is provided from mass transfer fluid source 440 (shown schematically) to flow through mass transfer microchannels 420 perpendicular to the view plane of FIG. 10. A heat transfer fluid is supplied from heat transfer fluid source 450 (shown schematically) to flow through heat transfer microchannels 430 co-current, counter-current, or cross-current to fluid flowing through mass transfer microchannels.

Device 400 further includes liquid 422a and gas 422b. Liquid 422a is conveyed with liquid conveying structure 435 included in each microchannel 420 in thermal contact with fin 424. Structure 435 can be a form of capture structure that retains liquid by capillary forces or interfacial tension, such as a wick 437, an arrangement of capillary tubes, a porous solid material, grooves, or the like. Liquid movement with structure 435 can be to or from liquid reservoir 460, which is schematically represented in FIG. 10. For the configuration of device 400, mass transfer occurs at a liquid/gas interface formed between liquid 422a carried with structure 435 and gas 422b in contact with such liquid. Such an arrangement may be desired to carry out distillation, gas absorption, gas desorption, reactive distillation, gas-liquid reactions, or another multiphasic chemical process. As in the case of device 102 and 300, the structure 304 of device 400 can be repeated as needed to form an array of interspersed mass transfer microchannels 420 and heat transfer microchannels 430.

Where structure 435 of device 400 is provided as wicking, the gas is provided as a vapor fluid, and mass exchange is occurring between the phases; heat generated or consumed at the gas-liquid interface per unit area is determined by the enthalpy change, $\Delta H_m$, per unit mass exchange times the mass flux, $j_m$. Further, given the extended area structure is designed with high fin efficiency and the thermal conductivity and thickness of the gas media is high enough so that the overall heat transfer resistance between the gas-liquid interface and the heat transfer media is dominated by the resistance from the wall to the heat transfer media, then expression (2) results as follows:

$$U A_{w=hc} A_w \quad (2)$$

where U is the overall heat transfer coefficient, $A_w$ is the primary heat transfer area, and $h_c$ is the heat transfer coefficient between the wall and the heat transfer media.

Because the diffusivity in the gas phase is about five orders of magnitude higher than the diffusivity of the liquid phase and the width of gas and liquid media phases are comparable, the mass transfer resistance is typically dominated by the liquid phase mass transfer, which for mass transfer into the liquid phase is represented by expression (3) as follows:

$$j_d \approx k_m(c_l^{eq} - \bar{c}_l) \quad (3)$$

where $k_m$ is the mass transfer coefficient in the liquid phase, $c_l^{eq}$ is liquid phase equilibrium concentration at the given bulk gas phase concentration and $c_l$ is the bulk liquid phase concentration. In order for mass and heat transfer to be balanced (avoiding excess heat transfer area or mass transfer area), the relationship of expression (4) results as follows:

$$\frac{A_m}{A_w} \approx \frac{h_c(T_w - T_x)}{\Delta H_m k_m(c_l^{eq} - \bar{c}_l)} \quad (4)$$

where $A_m$ is the area for mass transfer, $A_w$ is the area for heat transfer, $T_w$ is the temperature of the wall between the phases, and $T_x$ is the bulk heat transfer media temperature. This represents a local condition for balancing the heat and mass transfer. When the area ratio is typically constant down the flow length, achieving an overall balance corresponds to expression (5) as follows:

$$\frac{A_m}{A_w} \approx \frac{h_c LMTD}{\Delta H_m k_m LMCD} \quad (5)$$

where LMTD is the log-mean temperature difference between the liquid phase and heat transfer fluid calculated using the inlet and outlet temperatures, and LMCD is the log-mean concentration difference between the liquid and gas phases. Correspondingly, decoupling of the heat and mass transfer characteristics with extended area structures is augmented when $A_m/A_w \gg 1$.

In one alternative embodiment, gas 422b could be provided in closer proximity to fin 424 than liquid 422b. In such a case, liquid-conveying structure 435 could be located between fins without contacting them. Generally, liquid flow closer to the fins than the gas flow favors heat transfer, while gas flow closer to the fins than the liquid flow favors mass transfer. In another embodiment, microchannel device 400 is oriented with the vertical direction being into the page and liquid 422a is provided in the form of a free-falling film on fin 424, wall 426a and/or wall 426b adjacent to a fluid including a gas that flows either co-current or counter-current to the liquid flow. This embodiment may be employed with or without structure 435.

In still another embodiment, structure 435 of device 400 can be oriented relative to vertical to use gravity to enhance or retard liquid movement with structure 435. Furthermore, the contribution of gravity can be modulated by orienting the device at some angle between vertical and horizontal liquid flow. In still another embodiment, a porous structure, such as an expanded metal screen, can be placed in the gas flow path to provide mechanical support, better define the gas flow channel, and/or to alter heat transfer.

Figure 18:
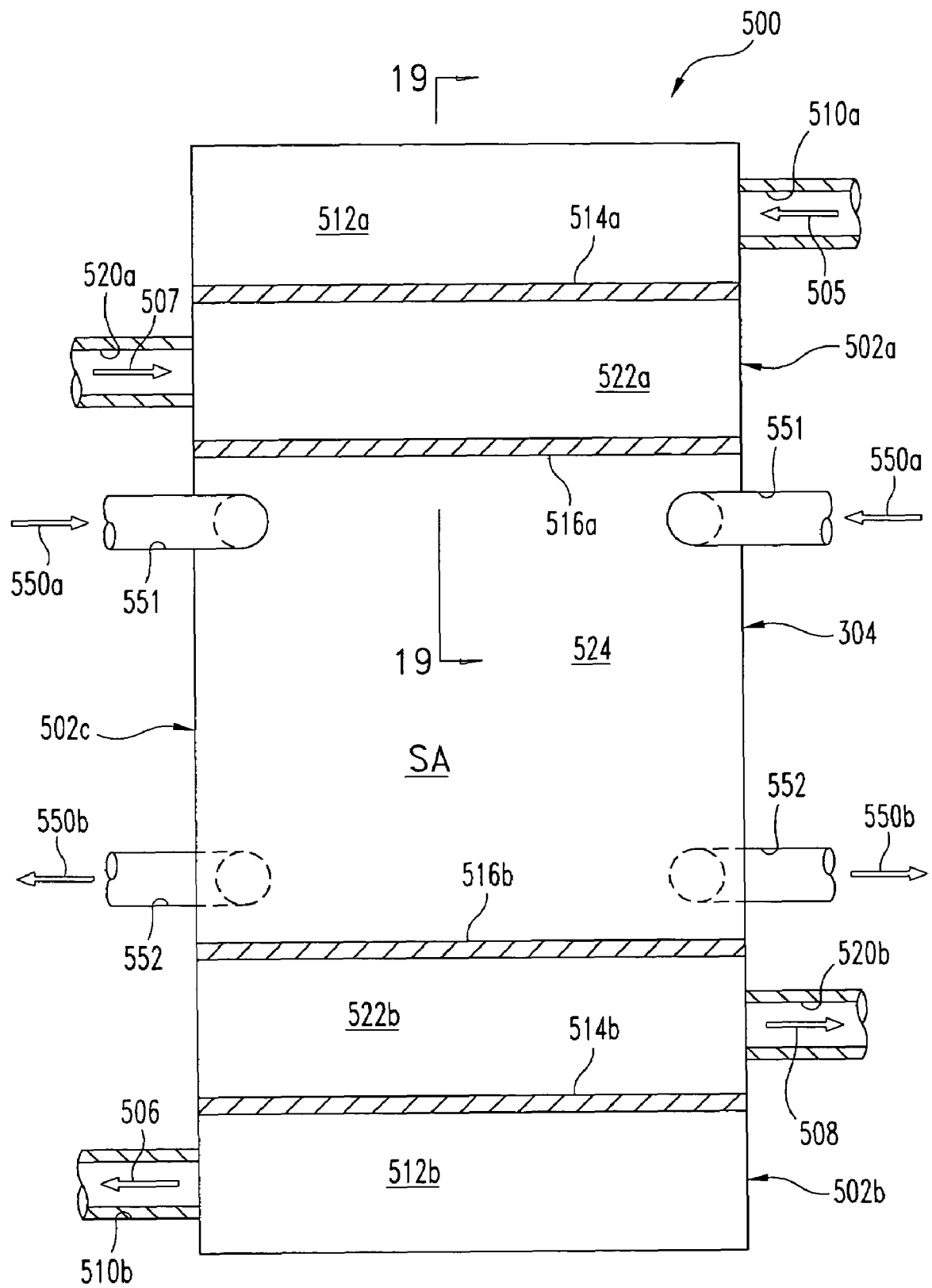
FIG. 18 is partial sectional, diagrammatic view of a distillation device.

FIGS. 18-22 depict distillation apparatus 500 of a further embodiment of the present application. In FIG. 18, a partial sectional, diagrammatic side view is shown. Apparatus 500 includes an input section 502a. Section 502a includes inlet 510a to input liquid into header chamber 512a which is in fluid communication therewith, as indicated by arrow 505. Section 502a further includes inlet 520a in fluid communication with gas header chamber 522a to input gas, as indicated by arrow 507. Header chamber 512a is separated from header chamber 522a by wall 514a. Opposite section 502a, apparatus 500 also includes output section 502b. Section 502b includes outlet 510b in fluid communication with liquid header chamber 512b to provide for the removal of liquid, as indicated by arrow 506. Section 502b also includes outlet 520b in fluid communication with gas header chamber 522b to provide for the removal of gas, as indicated by arrow 508. Header chamber 512b I separated from header chamber 522b by wall 514b.

Between sections 502a and 502b is transfer section 502c. Section 502c is separated from sections 502a and 502b by walls 516a and 516b, respectively. Section 502c is shown with a representative heat transfer fin 524 where its transfer surface area SA is parallel to the view plane of FIG. 18; where many fins 524 are typically utilized as the extended heat transfer structures 304 previously described. Section 502c also includes microchannels to facilitate distillation with process fluids flowing therethrough and also to provide for heat transfer, as desired. Heat transfer is provided by passage of a heat transfer fluid through section 502c that is thermally coupled to fin 524. Heat transfer fluid is input via inlets 551 as indicated by arrows 550a and is output via outlets 552 as indicated by arrows 550b.

Figure 19:
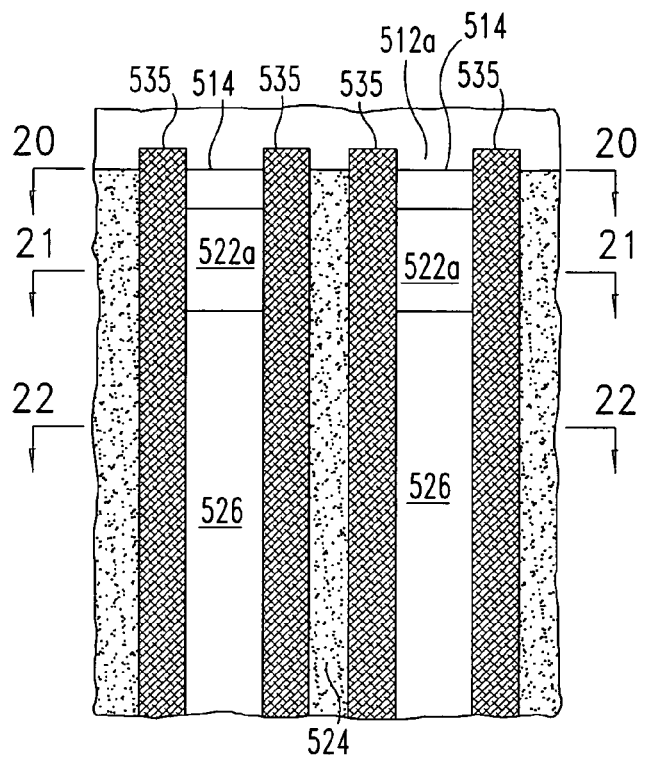
FIG. 19 is a sectional view of the distillation device taken along the section line 19-19 shown in FIG. 18.
Figure 20:
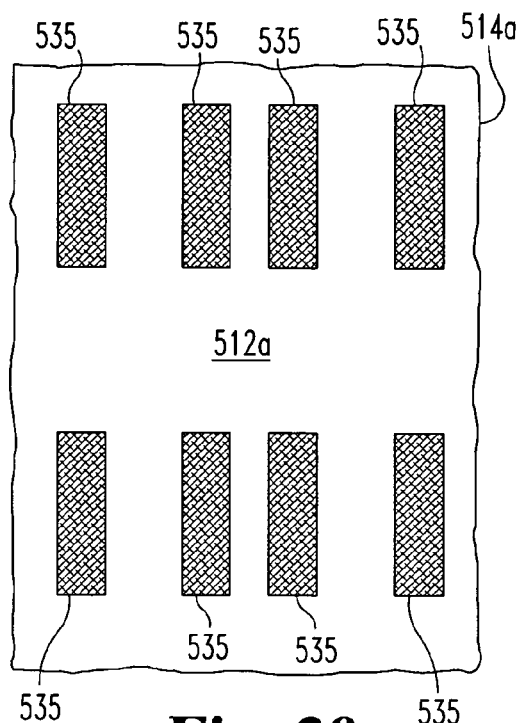
FIG. 20 is a sectional view of the distillation device taken along section line 20-20 shown in FIG. 19.
Figure 21:
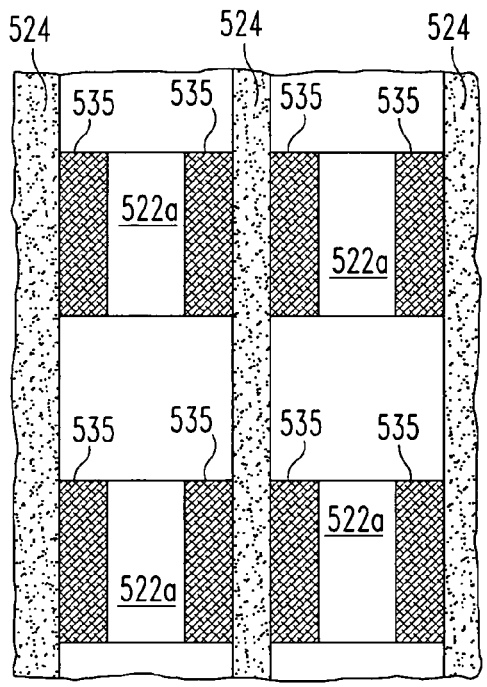
FIG. 21 is a sectional view of the distillation device taken along section line 21-21 shown in FIG. 19.
Figure 22:
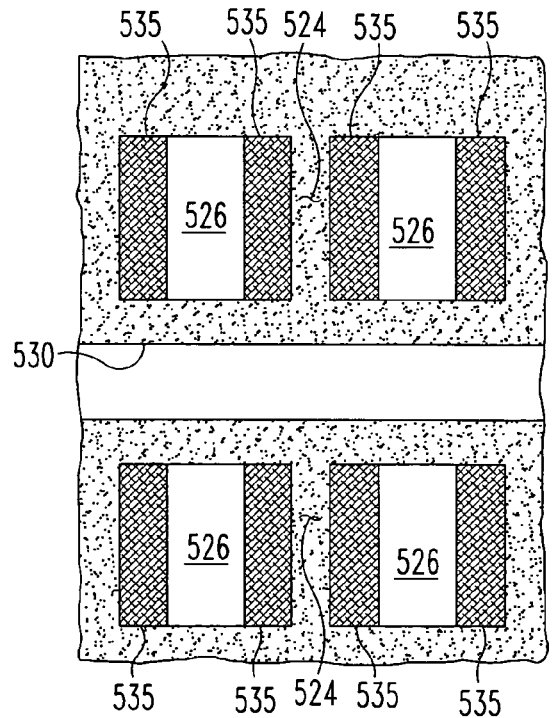
FIG. 22 is a sectional view of the distillation device taken along section line 22-22 shown in FIG. 19.

Referring additionally to the partial schematic sectional views of FIGS. 19-22, different internal features of apparatus 500 are illustrated. FIG. 19 is a partial profile sectional view taken along section line 19-19 shown in FIG. 18. FIG. 19 further depicts fin 524 between gas flow microchannels 526 that intersect gas header chamber 522a. Liquid header chamber 512a is also shown, being separated from header chamber 522a by wall 514a. Extending between header chambers 512a, 522a and along microchannels 526 are capture structures in the form of wicks 535. FIG. 20 is a sectional view taken along section line 20-20 of FIG. 19 that further shows liquid header chamber 512a and wall 514a from a view plane perpendicular to that of FIG. 19. The relative positioning and spacing of wicks 535 are also shown in FIG. 20. FIG. 21 depicts a partial sectional view with a view plan parallel to that of FIG. 20 as taken along section line 21-21 of FIG. 19. In FIG. 21, the relationship between wicks 535, header chamber 522a and fins 524 is further illustrated. FIG. 22, with a view plane parallel to that of FIGS. 20 and 21, corresponds to section line 22-22 shown in FIG. 19. FIG. 22 illustrates wicks 535 in relation to microchannels 526 and a representative heat transfer microchannel 530 that is in fluid communication at least one of inlets 551 and outlets 552. In operation, apparatus 500 utilizes structures 304 to facilitate distillation relative to the liquid media of wicks 535 and gas/vapor flowing through microchannels 526. This mass transfer process can regulated by controlling temperature via fins 524 in thermal communication with heat transfer microchannels 530 and correspondingly heat transfer fluid.

Figure 11:
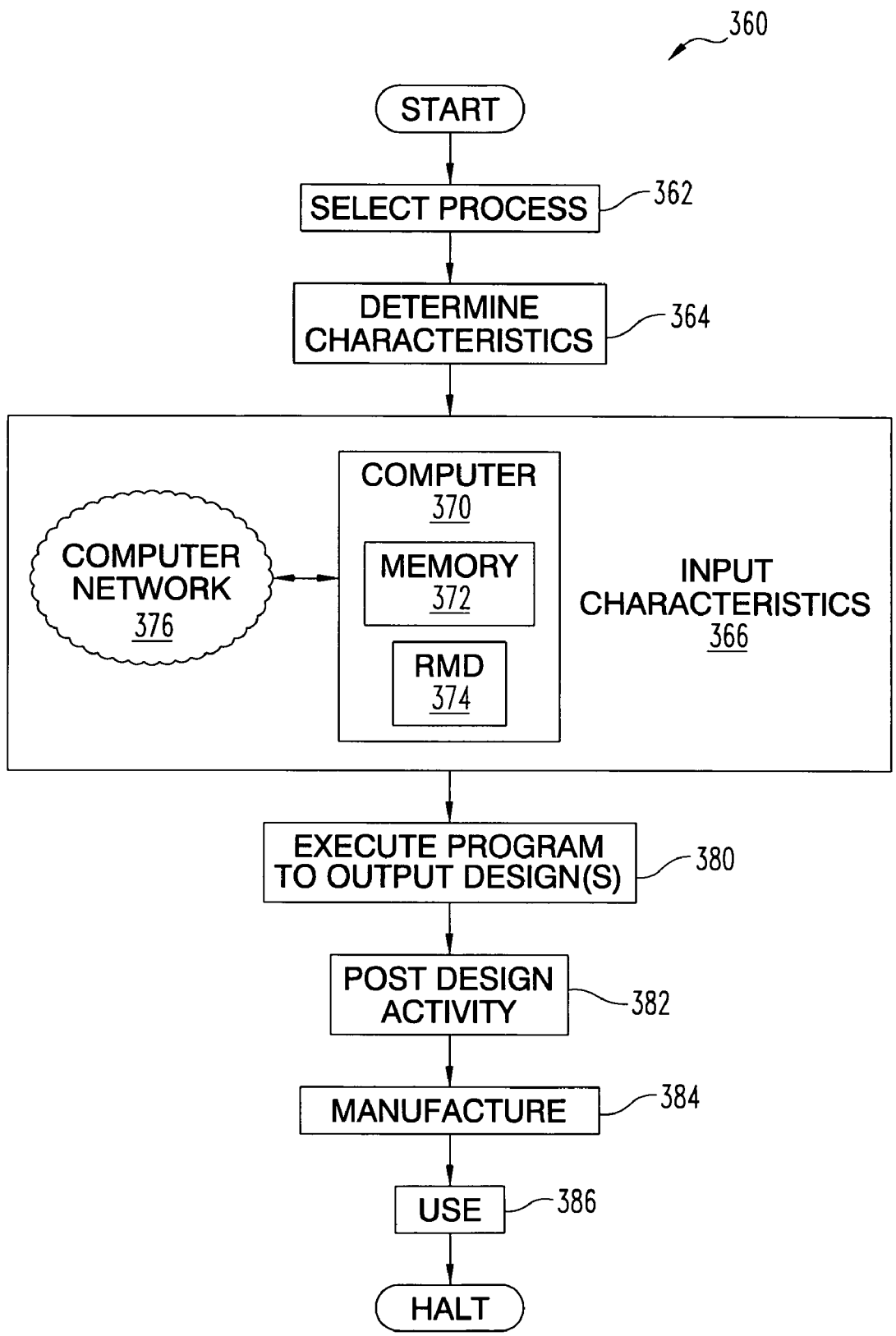
FIG. 11 is a flowchart of a device design procedure performed with a computer.

Referring to the flow diagram of FIG. 11, procedure 360 is illustrated. Procedure 360 provides a computer-generated design for a microchannel device including an extended surface area structure with fins in accordance with the design variables described in connection with FIG. 9. Procedure 360 starts with stage 362, in which a given mass transfer process is selected, including input materials, catalyst, and the like. Next, in stage 364, various device design characteristics are determined relative to the selected process. For example, a mass transfer characteristic and a heat transfer characteristic are determined as might correspond to a desired ratio between mass transfer area and primary heat transfer area. In other examples, a pressure drop characteristic, device size, process temperature profile, input fluid and output fluid mass flow, or the like can be determined.

In stage 366, the characteristics determined in stage 364 are input to a program stored in computer 370. Computer-executable instructions for this program and accompanying data can be stored in memory 372, with some or all stored on portable memory device 374 in the form of a disk, tape, cartridge, or nonvolatile solid-state device, just to name a few possibilities. In one particular form, programming instructions executable by computer 370 are initially provided to computer 370 with a portable memory device 374. Alternatively or additionally, instructions can be provided on at least a portion of computer network 376 communicatively coupled to computer 370. Stages 362 and/or 364 can also be performed with computer 370.

Based on the input of stage 366, the program is executed with computer 370 to provide a microchannel device design output in stage 380. This output may be in the form of computer-graphic drawings, textual descriptions, or the like to provide one or more microchannel designs employing extended surface area structure of the type described in connection with FIGS. 6, 7, 9-10, or 18-22. A design resulting from stage 380 can then be simulated, tested, prototyped, and/or provided for manufacture in stage 382. In stage 384, a design from stage 382 is made using standard techniques and then used in stage 386.

Many embodiments of the present application are envisioned. One example comprises: operating a device including a number of mass transfer microchannels, a heat transfer channel with a boundary defined by a thermally conductive wall, and a plurality of thermally conductive fins connected to the wall, with each one of the mass transfer microchannels being separated from another of the mass transfer channels by a respective one of the fins; providing a fluid media through each of the mass transfer microchannels; performing a mass transfer process in each of the microchannels; and flowing a heat transfer fluid through the heat transfer microchannel to regulate the mass transfer process by conductively transferring heat through the fins. In one form the mass transfer process is performed at a liquid-gas interface, the mass transfer process performs a chemical separation, and/or the mass transfer microchannels each have a gap height along a cross-section at least three times greater than a microchannel gap width between fins along the cross-section.

In another example, a microchannel device includes several mass transfer microchannels to receive a fluid media for processing, two heat transfer microchannels in fluid communication with a heat transfer fluid, two walls each defining at least a portion of a respective one of the heat transfer microchannels, and several fins each extending from one of the walls to another of the walls and being connected to the walls to provide heat transfer by conduction. The fins separate the mass transfer microchannels from one another.

In yet another example, a number of microchannel heat exchangers are each utilized at different stages of a reactor to regulate a highly endothermic or exothermic catalytic reaction in accordance with a designated temperature profile. Catalyst structures are provided between at least some of the heat exchangers. In one form, the amount and/or type of catalyst varies between different microchannel heat exchangers. Alternatively or additionally, product(s) and/or reactant(s) are introduced or removed at various interim stages to further regulate the reaction. In one particular application, the reactor is utilized to perform an exothermic PROX reaction, with at least three different stages each including a different amount and/or type of catalyst material and a heat exchanger.

A further example is directed to a method, comprising: operating a device including a number of mass transfer microchannels, a heat transfer channel with a boundary defined by a thermally conductive wall, and several thermally conductive fins connected to the wall, with each one of the mass transfer microchannels being separated from another of the mass transfer channels by a respective one of the fins; directing movement of a liquid between the fins in each of the mass transfer microchannels; performing a mass transfer process at an interface between the liquid and a gas in each of the mass transfer microchannels; and flowing a heat transfer fluid through the heat transfer microchannel to regulate the mass transfer process.

Still a further example comprises: operating a device including a number of mass transfer microchannels, a plurality of thermally conductive fins, a first heat transfer microchannel with a boundary defined by a first thermally conductive wall, and a second heat transfer microchannel with a boundary defined by a second thermally conductive wall. The fins are each connected to the first wall and the second wall to transfer heat by conduction and fins extend therebetween to separate the mass transfer microchannels from one another. This example further comprises: providing a fluid media to the microchannels; performing a mass transfer process with the fluid media in each of the microchannels between the fins; and flowing a heat transfer fluid through the first heat transfer microchannel and the second heat transfer microchannel to regulate temperature of the mass transfer process.

In another example, a method, comprises: operating a device including a number of mass transfer microchannels, a heat transfer channel with a boundary defined by a thermally conductive wall, and a plurality of thermally conductive fins connected to the wall, with each one of the mass transfer microchannels being separated from another of the mass transfer channels by a respective one of the fins; providing a fluid media through each of the mass transfer microchannels; separating a liquid and a gas from one another by performing a mass transfer process at a liquid/gas interface in each of the microchannels; and flowing a heat transfer fluid through the heat transfer microchannel to regulate the mass transfer process by conductively transferring heat through the fins.

For a further example, a system, comprises: a fluid media source, a liquid reservoir, a heat transfer fluid source, and a microchannel processing device. The microchannel processing device includes a number of mass transfer microchannels in fluid communication with the fluid media source to receive a gas flow therefrom; a number of liquid conveying structures that retain a liquid by capillary force or interfacial tension, are each in fluid communication with the liquid reservoir, and are each positioned in a respective one of the mass transfer microchannels; a number of heat transfer microchannels in fluid communication with the heat transfer fluid source; a number of walls each defining at least a portion of one of the heat transfer microchannels; and a number of fins each corresponding to a mass transfer surface area extending along a respective one of the mass transfer microchannels and each extending from a respective one or more of the walls to provide heat transfer between the mass transfer microchannels and the heat transfer microchannels.

For this example, further inventive aspects are: wherein the liquid conveying structures each include a wick; wherein each of the fins is connected to two of the walls and extends therebetween, the walls each define a heat transfer fluid contact surface and an opposite side, and the opposite side is connected to the fins and defines a boundary of at least a portion of one or more of the mass transfer microchannels; a catalyst positioned in each of the mass transfer microchannels; and/or wherein a cross section of the device taken perpendicular to the flow path of the fluid media through the mass transfer microchannels defines a microchannel gap height along the cross section and a microchannel gap width along the cross section for each of the mass transfer microchannels, and a ratio of the microchannel gap height to the microchannel gap width is at least three for each of the mass transfer microchannels. In a more preferred embodiment, this ratio is at least five for each of the mass transfer microchannels, and in an even more preferred embodiment, this ratio is at least ten for each of the mass transfer microchannels.

Still a further example is an apparatus, comprising: a microchannel device including: several mass transfer microchannels to receive a fluid media along a flow path therethrough that each have a gap width and a gap height along a cross section of the device taken perpendicular to the flow path, with a ratio of the gap height to the gap width being at least three for each of the mass transfer microchannels; a heat transfer microchannel to receive heat transfer fluid that is thermally coupled to the mass transfer microchannels; a thermally conductive wall defining a heat transfer fluid coupling surface bounding the heat transfer microchannel and an opposite side of the wall that provides a boundary of each of the mass transfer microchannels; and several fins each extending from the wall to separate the mass transfer microchannels from one another and transfer heat between the heat transfer microchannels and the mass transfer microchannels by conduction. In one more preferred form, the ratio is at least five for each of the mass transfer microchannels, and in an even more preferred form, the ratio is at least ten for each of the mass transfer microchannels.

In one more preferred form of this example, this ratio is at least five for each of the mass transfer microchannels. In an even more preferred form, this ratio is at least ten for each of the mass transfer microchannels. Alternatively or additionally, this exemplary apparatus further comprises: means for providing the fluid media to the device, means for providing the heat transfer fluid to the device, a catalyst positioned in each of the mass transfer microchannels, and/or means for directing liquid movement to or from the mass transfer microchannels. In one particular form, this directing means includes means for conveying liquid by capillary action. In still another variation of this example, the wall is one of two opposing walls and the fins and the mass transfer microchannels extend between the two opposing walls. Further inventive, optional aspects of this example further comprise: means for supplying the fluid media to the device, means for providing the heat transfer fluid to the device, means for conveying liquid relative to each of the microchannels, a catalyst in each of the microchannels, and/or means for performing a chemical separation at a liquid/gas interface in each of the mass transfer microchannels. Alternatively or additionally for this example, the mass transfer microchannels each have a gap width and a gap height along a cross section of the device taken perpendicular to the flow path with a ratio of the gap height to the gap width being at least three for each of the mass transfer microchannels.

Yet a further example is a microchannel device comprising: several mass transfer microchannels to receive a fluid media along a flow path therethrough; two heat transfer microchannels to receive heat transfer fluid, the heat transfer microchannels being thermally coupled to the mass transfer microchannels; two thermally conductive walls each defining a heat transfer fluid coupling surface bounding a respective one of the two heat transfer microchannels and an opposite side, the opposite side of each of the walls providing a boundary of opposing end portions of each of the mass transfer microchannels; and several fins each extending between the walls to separate the mass transfer microchannels from one another and transfer heat between the heat transfer microchannels and the mass transfer microchannels by conduction.

In another example, a method of making a chemical processing device design, comprises: preparing the design of the device to perform a mass transfer process, with the device including a number of mass transfer microchannels, a heat transfer microchannel with a boundary defined by a thermally conductive wall, and a plurality of thermally conductive fins. The fins of the design are connected to the wall to transfer heat by conduction and extend from the wall to separate the mass transfer microchannels from each other. This preparation includes: determining a desired mass transfer characteristic and a desired heat transfer characteristic for the process; and dimensioning a mass transfer surface area of each of the fins and a heat transfer fluid contact surface area of the wall in relation to one another to provide the desired mass transfer characteristic and the desired heat transfer characteristic with the design. For this exemplary method, the preparing can be performed in accordance with a computer program, the method further includes making the device in accordance with the design after the preparing, the method further includes selecting a catalyst for inclusion in the mass transfer microchannels of the design, the wall is one of two walls and the fins extend between the walls, and/or the design includes a liquid conveying structure in each of the mass transfer microchannels.

A further example, includes device carrying instructions executable by a computer to prepare a design of a chemical mass transfer processing device that has a number of mass transfer microchannels, a heat transfer microchannel with a boundary defined by a thermally conductive wall, and a plurality of thermally conductive fins, that are connected to the wall to transfer heat by conduction and that extend from the wall to separate the mass transfer microchannels from each other. The instructions are further executable to dimension a mass transfer surface area of each of the fins and a heat transfer fluid contact surface area of the wall in relation to one another to provide a desired mass transfer characteristic and a desired heat transfer characteristic when the device is made in accordance with the design. The device may be a removable or portable memory, such as a computer-accessible disk and/or can include a portion of a computer network.

Yet a further example is directed to a method, comprising: flowing a reactant fluid through several first process microchannels of a first heat exchanger, the first heat exchanger including several first heat transfer microchannels thermally coupled to the first process microchannels; directing the reactant fluid through several microchannel passages defined by a first catalyzing structure, the first catalyzing structure including a thermally conductive support material carrying one or more selected catalysts to perform a chemical reaction with the reactant fluid; providing output fluid from the chemical reaction to several second process microchannels of a second heat exchanger, the second heat exchanger including several second heat transfer microchannels thermally coupled to the second process microchannels, wherein the first catalyzing structure abuts at least one of the first heat exchanger and the second heat exchanger, a housing extends between the first heat exchanger and the second heat exchanger to define a first reaction chamber containing the first catalyzing structure; and flowing a heat transfer fluid through the first heat transfer microchannels and the second heat transfer microchannels to regulate temperature of the chemical reaction.

For this method, it may further include providing fluid output from the second process microchannels to a second catalyzing structure defining a number of reaction microchannel passages therethrough and catalyzing further chemical reaction with the fluid output in the second catalyzing structure and providing resulting product to a third heat exchanger. Alternatively or additionally, the chemical reaction is of a preferential oxidation type and the reactant fluid includes CO, $O_2$, and $H_2$ and optionally, the method includes: performing the chemical reaction to reduce CO concentration in a product including molecular hydrogen; and providing the product to a fuel cell to generate electric power. In another refinement of this method, the first process microchannels and the second process microchannels each have a fluid flow path length less than or equal to a first distance and the first catalyzing structure extends between the first heat exchanger and the second heat exchanger a second distance, the second distance being greater than the first distance. For this refinement, the method optionally includes: providing fluid output from the second process microchannels to a second catalyzing structure defining a number of reaction microchannel passages therethrough; and directing a fluid stream from the second catalyzing structure through a third heat exchanger including a number of microchannels, the second catalyzing structure extending between the second heat exchanger and the third heat exchanger a third distance, the third distance being greater than the second distance.

In another exemplary embodiment, a method comprises: operating a multistage reactor including a first catalyzing structure, a first heat exchanger, and a second heat exchanger, the first heat exchanger and the second heat exchanger each including several process microchannels thermally coupled to several heat transfer microchannels, the process microchannels each having a flow path length equal to or less than a first distance, said operating including: (a) flowing fluid reactant through the process microchannels of the first heat exchanger to the first catalyzing structure, the first catalyzing structure including a thermally conductive support material defining a number of passageways therethrough and carrying one or more catalysts to enhance performance of a chemical reaction with the reactant; (b) directing resulting fluid of the chemical reaction through the process microchannels of the second heat exchanger, the first catalyzing member extending between the first heat exchanger and the second heat exchanger a second distance, the second distance being greater than the first distance; and (c) regulating temperature of the chemical reaction by controllably flowing heat transfer fluid through the heat transfer microchannels of each of the first heat exchanger and the second heat exchanger, the first catalyzing member abutting at least one of the first heat exchanger and the second heat exchanger to be in thermal communication therewith.

In such an example, further optional refinements can include a housing that extends between the first heat exchanger and the second heat exchanger to define a first reaction chamber containing the first catalyzing structure. Alternatively or additionally, the method includes: providing a fluid stream from the second heat exchanger to a second catalyzing structure abutted there against to form a thermal interface, the second catalyzing structure defining a number of reactant microchannel passages therethrough and providing at least one of: (a) the second catalyzing structure with at least 50% more of at least one of the one or more catalysts of the first catalyzing structure and (b) the second catalyzing structure including a catalyst different than the one or more catalysts of the first catalyzing structure. Optionally, the method of this example includes: providing a fluid stream from the second heat exchanger to a second catalyzing structure abutted thereagainst to form a thermal interface, the second catalyzing structure defining a number of reactant microchannel passages therethrough; providing fluid output to a third heat exchanger from the second catalyzing structure, the second catalyzing structure extending between the second heat exchanger and the third heat exchanger a third distance greater than the second distance by at least 50%; and performing at least one of: (a) introducing further reactant into the second catalyzing structure through a port positioned downstream from the first catalyzing structure, (b) routing at least a portion of a product provided by the first catalyzing structure away from the second catalyzing structure, and (c) providing a catalyst with the second catalyzing structure that is different than the one or more catalysts of the first catalyzing structure. Yet further optional refinements include: the first catalyzing structure having a first face defining an inlet for each of a number of the passageways and a second face defining an outlet for each of a plurality of the passageways, the first face opposes the second face, the first face is thermally interfaced with a downstream face of the first heat exchanger, and the second face is thermally interface with an upstream face of the second heat exchanger. In addition or as an alternative to such refinement, the method includes: providing a fluid stream from the second heat exchanger to a second catalyzing structure abutted thereagainst to form a thermal interface, the second catalyzing structure defining a number of reactant microchannel passages therethrough; providing fluid output to a third heat exchanger from the second catalyzing structure, the second catalyzing structure extending between the second heat exchanger and the third heat exchanger a third distance greater than the second distance; directing output fluid from the third heat exchanger to a third catalyzing structure abutted there against and defining a number of microchannel passages therethrough; and flowing resulting fluid from the third catalyzing structure to a fourth heat exchanger, the third catalyzing structure extending between the third heat exchanger and the fourth heat exchanger a fourth distance greater than the third distance.

Still a further example includes a method, comprising: providing reactant fluid including CO, $O_2$, and $H_2$ to a first catalyzing structure, the first catalyzing structure defining several first passageways and catalytically performing a preferential oxidation reaction with the reactant fluid to reduce CO concentration; flowing the reactant fluid from the first catalyzing structure through several first process microchannels of a first heat exchanger, the first heat exchanger including several first heat transfer microchannels thermally coupled to the first process microchannels to regulate temperature thereof by flowing a heat transfer fluid through the first heat transfer microchannels; directing the reactant fluid passing through the first process microchannels to a second catalyzing structure defining several second passageways to receive the reactant fluid from the first heat exchanger and catalytically perform the preferential oxidation reaction; flowing the reactant fluid from the second catalyzing structure through several second process microchannels of a second heat exchanger, the second heat exchanger including several second heat transfer microchannels thermally coupled to the second process microchannels to regulate temperature thereof by flowing a thermal transfer fluid through the second heat transfer microchannels; and providing at least one of: (a) a greater amount of a catalytic substance in the second catalyzing structure than the first catalyzing structure, (b) a different catalytic substance in the second catalyzing structure relative to the first catalyzing structure, and (c) additional $O_2$ to the reactant fluid between the first catalyzing structure and the second catalyzing structure.

As further optional refinements of this example, the first heat exchanger, the second heat exchanger, the first catalyzing structure, and the second catalyzing structure are included in a reactor, and further comprising: providing molecular hydrogen from the reactor to a fuel cell to generate electric power; and/or the second catalyzing structure extends between the first heat exchanger and the second heat exchanger a first distance and is surrounded by a fluid-containing housing, the first process microchannels and the second process microchannels each have a fluid flow path length equal to or less than a second distance, and the first distance is at least 50% greater than the second distance. Alternatively or additionally, this method includes providing output fluid from the second heat exchanger to a third catalyzing structure and providing a resulting fluid from the third catalyzing structure to a fourth heat exchanger and/or providing the reactant fluid from a water gas shift reactor.

Another example relates to a multistage microchannel reactor that includes: a first catalyzing structure including thermally conductive support material defining several passageways therethrough and carrying one or more selected catalysts to catalyze a chemical reaction; a first heat exchanger and a second heat exchanger each including a plurality of process microchannels and a plurality of heat transfer microchannels thermally coupled to corresponding ones of the process microchannels, the process microchannels each having a flow path length less than or equal to a first distance; a housing extending between the first heat exchanger and the second heat exchanger to define a reaction chamber in fluid communication with the process microchannels of each of the first heat exchanger and the second heat exchanger, the first catalyzing structure being positioned in the reaction chamber, abutting at least one of the first heat exchanger and the second heat exchanger to form a thermal transfer interface therewith, and extending from the first heat exchanger to the second heat exchanger over a second distance greater than the first distance. Optionally, this reactor can include: a second catalyzing structure to receive fluid output from the second heat exchanger; means for providing at least one of: (a) a greater amount of a catalytic substance in the second catalyzing structure than the first catalyzing structure, (b) a different catalytic substance in the second catalyzing structure relative to the first catalyzing structure, and (c) additional $O_2$ to the reactant fluid between the first catalyzing structure and the second catalyzing structure; and/or a third heat exchanger, the second catalyzing structure extending between the second heat exchanger and the third heat exchanger a third distance greater than the second distance.

A further example is directed to a system that comprises: a water gas shift reactor operable to produce a fluid stream including CO, $O_2$, and $H_2$; a preferential oxidation reactor operable to receive the fluid stream, the preferential oxidation reactor including: a first catalyzing structure defining several first passageways to receive the fluid stream and being operable to catalytically perform a first preferential oxidation reaction with the fluid stream to reduce CO concentration; a first heat exchanger including several first process microchannels to receive fluid output from the first catalyzing structure and several heat transfer microchannels thermally coupled thereto to regulate temperature; a second catalyzing structure defining several second passageways and being operable to catalytically perform a second preferential oxidation reaction with fluid output from the first process microchannels to reduce CO concentration thereof; a second heat exchanger including several second process microchannels to receive fluid output from the second catalyzing structure and several heat transfer microchannels thermally coupled thereto to regulate temperature; and one or more fuel cells to receive hydrogen from the preferential oxidation reactor to generate electric power.

Other embodiments, include, but are not limited to: directing reactant fluid through several process microchannels of a first heat exchanger, the first heat exchanger including several heat transfer microchannels each thermally coupled to one or more of the several process microchannels; providing the reactant fluid from the first heat exchanger to a first catalyzing structure to catalyze a chemical reaction therewith, the first catalyzing structure defining a number of microchannel passageways therethrough; flowing a fluid stream from the first catalyzing structure through a number of process microchannels of a second heat exchanger, the second heat exchanger including a number of heat transfer microchannels each thermally coupled to one or more of the number of process microchannels; and flowing a heat transfer fluid through the first heat exchanger and the second heat exchanger to control temperature of the chemical, the first catalyzing structure being positioned between the first heat exchanger and the second heat exchanger in an abutting relationship to form a thermal interface with each of the first heat exchanger and the second heat exchanger.

EXPERIMENTAL EXAMPLES

The present invention will be further described with reference to the following specific examples. It will nevertheless be understood that these examples are merely illustrative and are not intended to restrict or otherwise limit the scope of the present invention. Furthermore, it is not intended that the present invention be limited to any expressed theory or mechanism of operation provided herein.

Example One

Steam Reformer experiments have been conducted with a panel about 80 $cm^3$ in volume (including headers) that was configured in the manner described in connection with reactor 40. The reactor was designed for 500 We operation with a pressure drop of approximately 1 inch $H_2O$ across the combustion gas side of the reformer panel. For the steam reforming work performed here, the hydrocarbons studied have included methane, propane, butane, isooctane, and a fuel mixture called benchmark fuel, which is a mixture of hydrocarbons that was developed to simulate a sulfur-free gasoline. A higher steam to carbon ratio results in higher conversion, but results in an energy penalty caused by the need to vaporize and heat more water. Higher temperatures also result in higher conversions, limited primarily by the catalyst sintering temperature and reactor material constraints. Tests were performed with a precious metal catalyst at a steam to carbon ratio of 3:1 and are based on a hydrocarbon conversion of greater than 99%. Higher temperatures yielded higher catalyst productivity. For example, the productivity for benchmark fuel tripled as the temperature was increased from 650° C. to 850° C. From this testing, higher temperature also improve the catalyst sulfur tolerance with an increase in the $CO:CO_2$ ratio.

Example Two

A two-section WGS shift reactor was designed based on the two-section approach of the reactor 100 configuration for a steam reformate stream. This design was subjected to various calculations and simulation. The design was based on Model No. PMS5B catalyst from Süd Chemie, Louisville, Ky. For the WGS reaction, an appropriate catalyst powder can be based on a cerium oxide supported precious metal catalyst, which has a high activity, although a low activity precious metal catalyst, a copper-based catalyst, or combinations thereof could also be used. Other suitable WGS reaction catalysts include low activity precious metal catalysts, copper-based catalysts, or any of the catalysts described in U.S. Pat. No. 5,128,307 to Wanjek et. al, and U.S. Pat. No. 5,990,040 to Hu et al. Combinations of catalysts, such as a combination of a high temperature and low temperature catalyst could also be used. High temperature catalysts would have a lower precious metal content.

Figure 12:
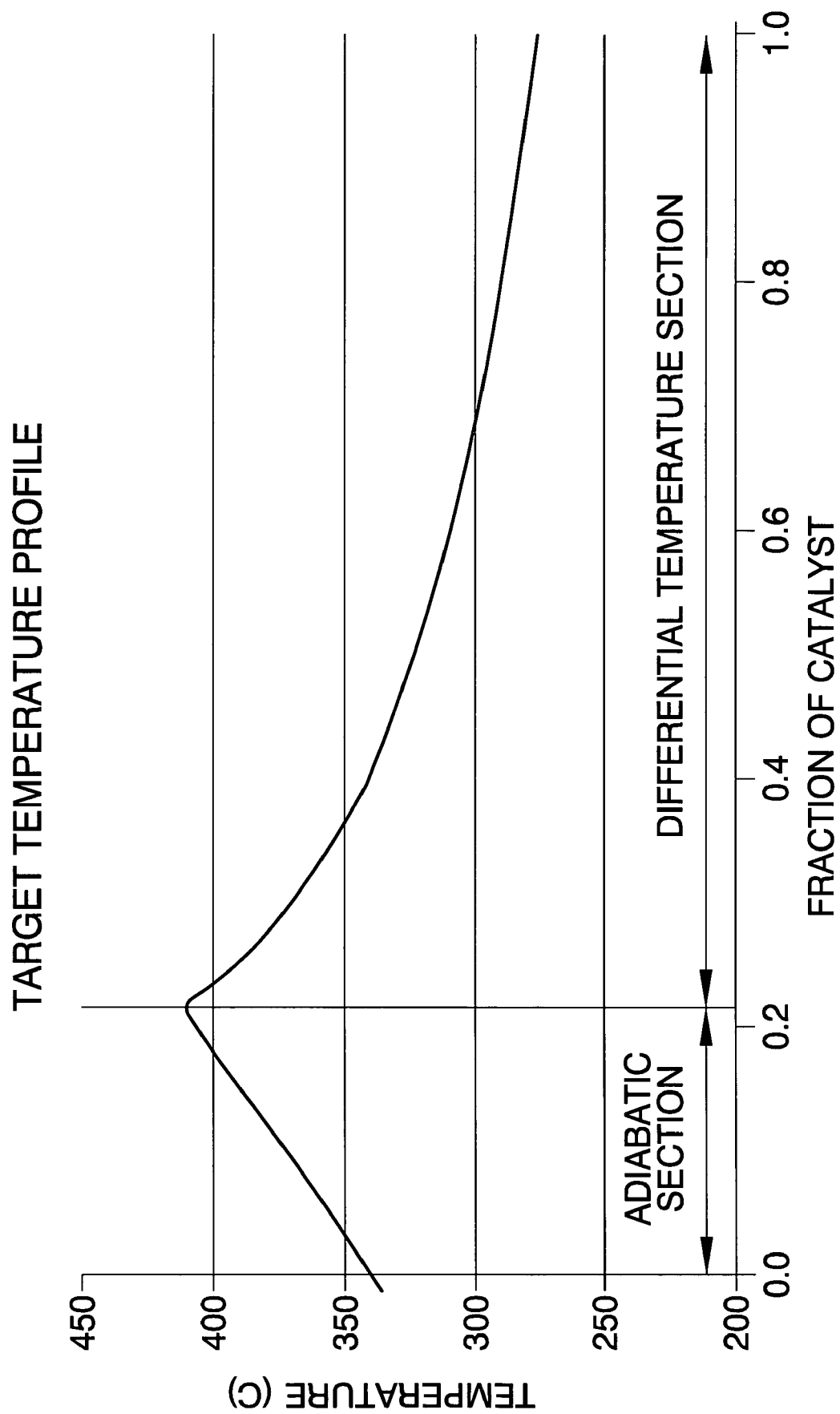
FIG. 12 is a predicted temperature profile for a two-section WGS reactor corresponding to the reactor of FIGS. 6 and 7.

Starting with a steam reformate generated from a liquid hydrocarbon fuel at a 3:1 steam to carbon ratio in the reformer, the WGS reactor was designed with an adiabatic section that accomplished 62% of carbon monoxide conversion using 22% of the catalyst mass as shown in FIG. 12 based on calculations. After the adiabatic section, a differential temperature section was designed to increase CO conversion to 90% (9.9% to less than 1 percent on a wet basis).

This WGS reactor design included heat exchange channels that are 0.020" wide ($h_x$) and reactant channels that are 0.050" wide ($h_f+2h_c$), including catalyst 0.020" wide ($h_c$), and 0.236" high ($w_c$). The walls between the reactant channels (fins) are 0.010" ($t_f$) and the wall between the heat exchange channels and the reactant channels is 0.030" ($t_w$). The design calls for a 2-kWe-scale reactor (processing sufficient steam reformate to power a 2 kWe PEM fuel cell stack operating at 44% efficiency, i.e. 4.5 kW LHV of $H_2$ in the anode feed) having 25 reactant channels in each horizontal array and a stack of 5 arrays and 6 heat exchange channels. The reactor core (without side walls and headers) is 3.8 cm by 4.7 cm and 8 cm long for a total volume of 145 cubic centimeters, which would be 3.3 liters if scaled up to a 50 kWe size. The calculated channel pressure drops in both streams is less than ⅓ psi, not including header losses.

The gas hourly space velocity (GHSV) based on the mass of catalyst powder loaded in the reactor is about 100,000 (1/hr). The volume fraction of the core that is occupied by the active catalyst material is 51.6%. The power density and specific power of the core are 15,200 We/L and 6400 We/kg, respectively.

The reactor is designed to operate with air as the coolant flowing co-current to the direction of the reformate stream. At the hot end of the reactor, the reformate temperature is designed to be 410° C. and the coolant air is at 167° C. At the cold end, the design has a reformate temperature that drops to 277° C. and the coolant air rises to 257° C. Heat transfer coefficients calculated from correlations for flow in rectangular ducts indicate that the heat flux at the two ends will support the desired temperature profile shown in FIG. 12, which is calculated from the kinetic model for the PMS5B catalyst. FIG. 12 illustrates the adiabatic temperature profile in the first section followed by the optimal temperature profile for the differential temperature section. Heat transfer calculations indicate that the heat transfer resistance is dominated by the heat transfer channel, and the temperature gradient along the length of the fin is about 0.1° C. at the hot end of the differential section and less than that along the length, indicating the temperature gradients in the cross-sections of the catalyst strips are minimal.

Example Three

Experiments were done with a differential reactor section comparable to that illustrated in FIGS. 6 and 7. This approach was validated with a low temperature shift reactor operating at 76,000 GHSV with a steam to dry gas ratio of 0.52 and an initial inlet CO concentration of 4.6%. When operated as an adiabatic reactor, at higher temperatures, the minimum CO concentration was limited by the equilibrium of the WGS reaction. As the temperature decreased, the equilibrium CO concentration continued to decrease, but the reaction kinetics also decreased. At sufficiently low temperatures, equilibrium conversions were not possible because of the slow reaction kinetics. This resulted in an increase in CO concentration out of the reactor. With a differential reactor, the CO concentration was able to reach levels lower than the adiabatic case because the reactor inlet is at higher temperatures with favorable reaction kinetics and then the exit is at a lower temperature where only small CO conversion is required to maintain the concentration near equilibrium in spite of the slow kinetics.

Figure 13:
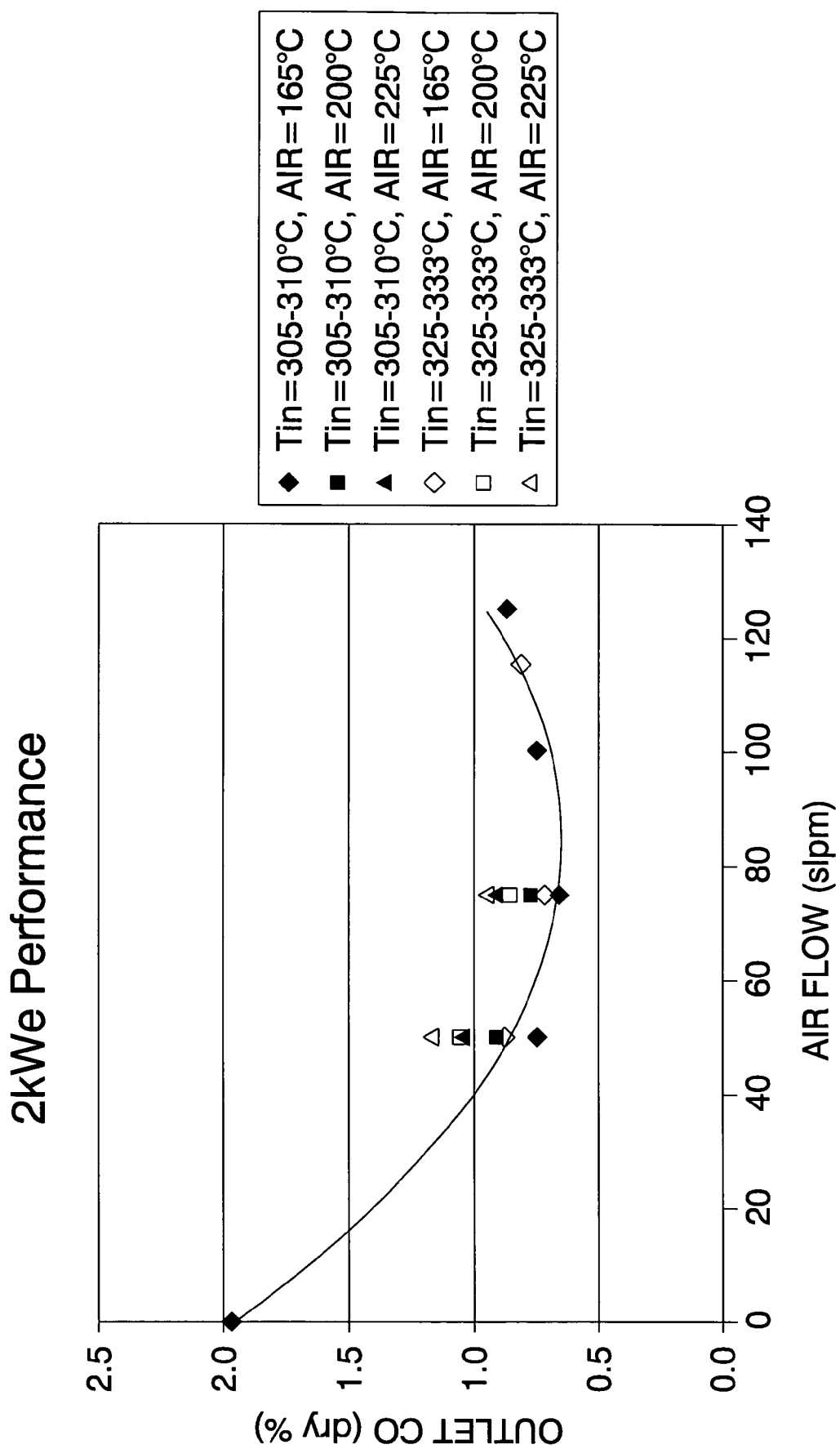
FIGS. 13-16 are graphs of experimental results.

This reactor was run over a range of air flow rates in order to evaluate the benefits of the reactor design. For the work done here, the composition of the feed stream is shown in Table I. The reactor was designed for 2 kWe throughput (corresponding to 29 slpm dry gas feed and based on 44% efficient fuel cell). At more or less adiabatic conditions, the CO concentration is greater than 2% (zero air flow). FIG. 13 further illustrates experimental results. By increasing the cooling air flow, the temperature at the exit can be reduced and CO concentrations below 1% are possible. During testing, the differential section ranged from 350-400° C. at the inlet to 250-300° C. at the outlet. For flow rates up to 2 kWe, the exit CO concentration remained within a few percent of the equilibrium concentration. Exit CO concentrations of <1% were possible with the reactor flows up to 2.5 kWe. As seen in the figure, there is an air flow rate where the minimum CO concentration can be achieved exiting the differential section. Higher flow rates tend to quench the reaction prematurely and lower flow rates do not decrease the temperature at the exit sufficiently to obtain a low equilibrium concentration driving force. The GHSV for this reactor at 2 kWe was 64,000 overall. The reactor was loaded with a commercially available SudChemie precious metal catalyst.

TABLE I

| Component | Dry Basis Composition | Wet Basis Composition |
|---|---|---|
| $H_2$ | 74% | 49.3% |
| CO | 12% | 8% |
| $CO_2$ | 14% | 9.3% |
| $H_2O$ | | 33% |

Unlike the differential section that followed the expected profile closely, the adiabatic section had a temperature rise of approximately 30-40° C. This is less than the expected 60° C. This reduced temperature is probably due to heat losses to the differential temperature side of the reactor. These heat losses tend to improve reactor performance by allowing the temperature to approach equilibrium at a lower temperature resulting in CO concentrations of ~2-3% at the exit of the adiabatic section rather than the expected ~4% equilibrium value at 410° C.

Example Four

Before the PROX reactor was developed, testing was performed on several commercially available catalysts both at first stage CO concentrations (1%) and section stage low CO concentrations (330 ppm). Catalysts were found with high selectivity and activity. The first stage catalyst selected was a non-precious metal catalyst for PROX from Süd Chemie, of Louisville, Ky. Conversions of ~97% were achieved at ~200° C. to yield approximately 300 ppm CO exiting the first stage. Increasing the temperature above 200° C. resulted in complete O2 conversion and a reduction in selectivity toward the CO oxidation reaction. The second stage catalyst was selected from two Engelhard precious metal catalysts. Again conversions of >97% were possible only over a limited temperature range. The higher temperature catalyst was selected because it had a wider range of operating temperatures and operated at a temperature very similar to that of the first stage catalyst (200° C.).

To achieve a 10 ppm CO output limit, a microchannel reactor with four chambers was developed and loaded with three of the four chambers using SudChemie first stage catalyst and the final chamber with the Engelhard second stage catalyst. This reactor included an extra intermediate stage relative of the reactor 200 configuration. In this way the entire reactor could be operated at 200° C. For the 2 kWe testing performed with the reactor, an oil bath was used to cool the heat exchanger panels and maintain the temperature near 200° C. In an actual test, pressurized water at its boiling point could potentially be used to control the reaction temperature. The composition of the feed stream for this testing is shown in Table II as follows:

TABLE II

| Component | Dry Composition | Wet Composition |
| --- | --- | --- |
| $H_2$ | 79% | 60.8% |
| CO | 1% | 0.8% |
| $CO_2$ | 20% | 15.4% |
| $H_2O$ | — | 23.1% |

Figure 14:
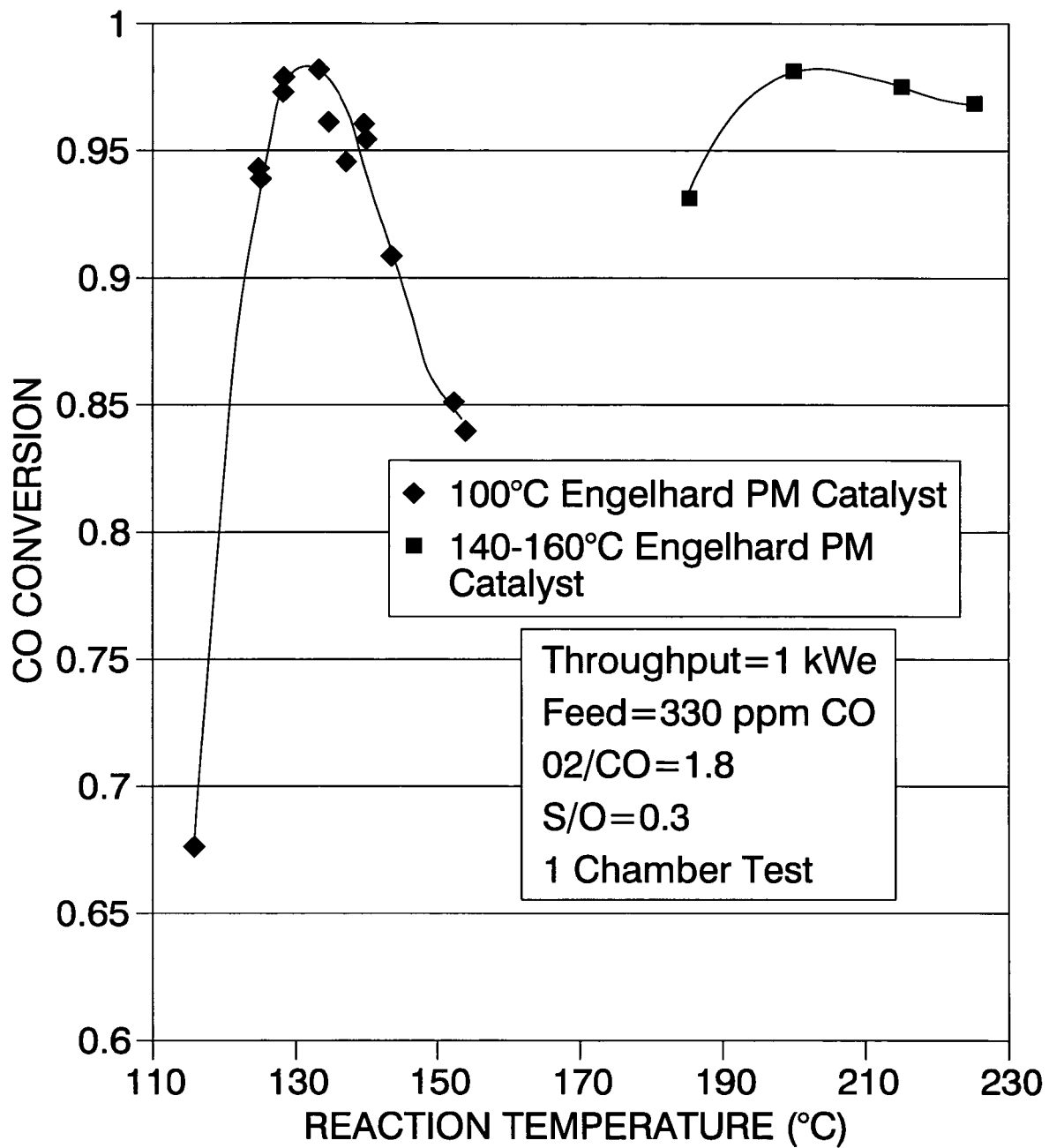
Figure 15:
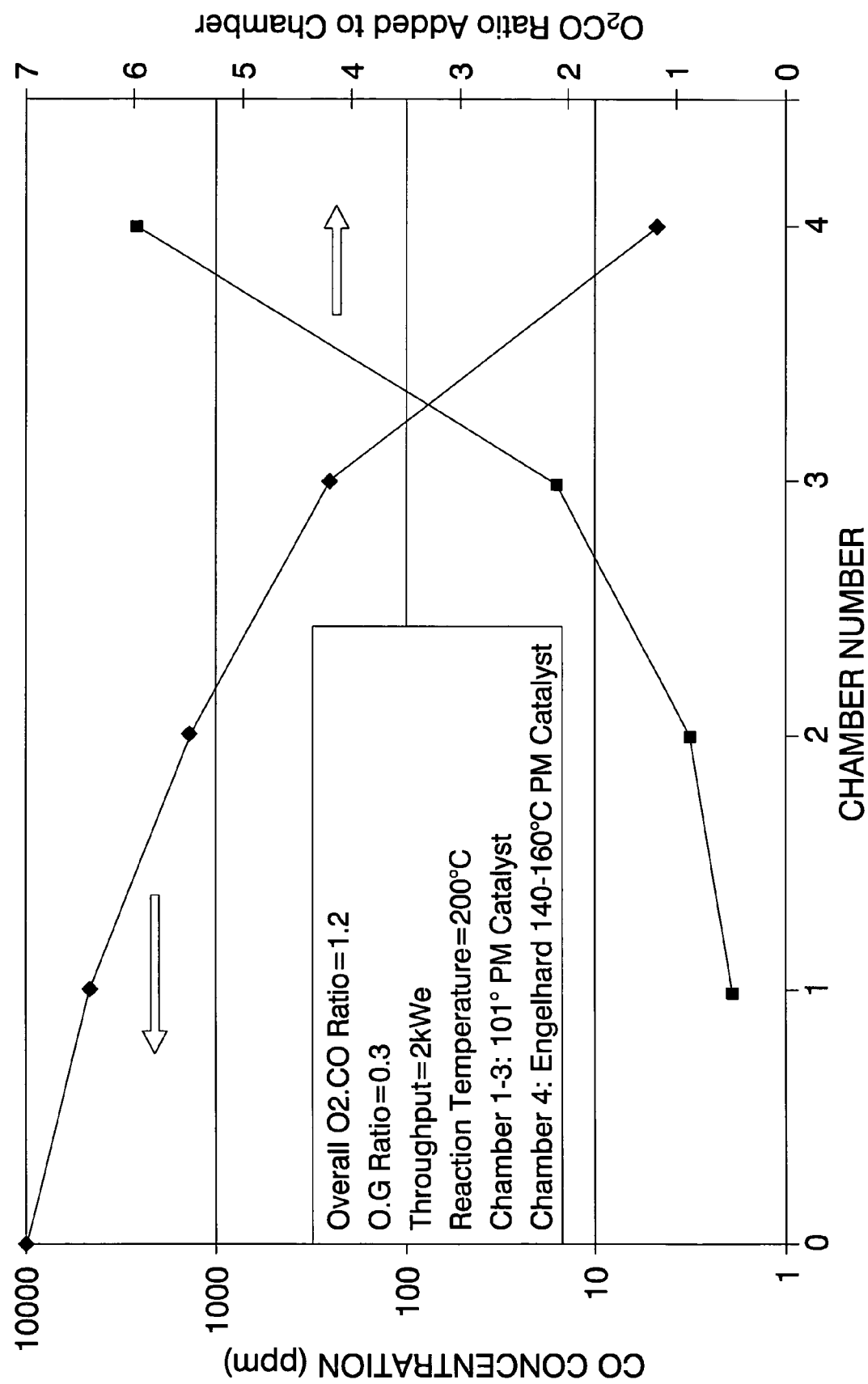
Figure 16:
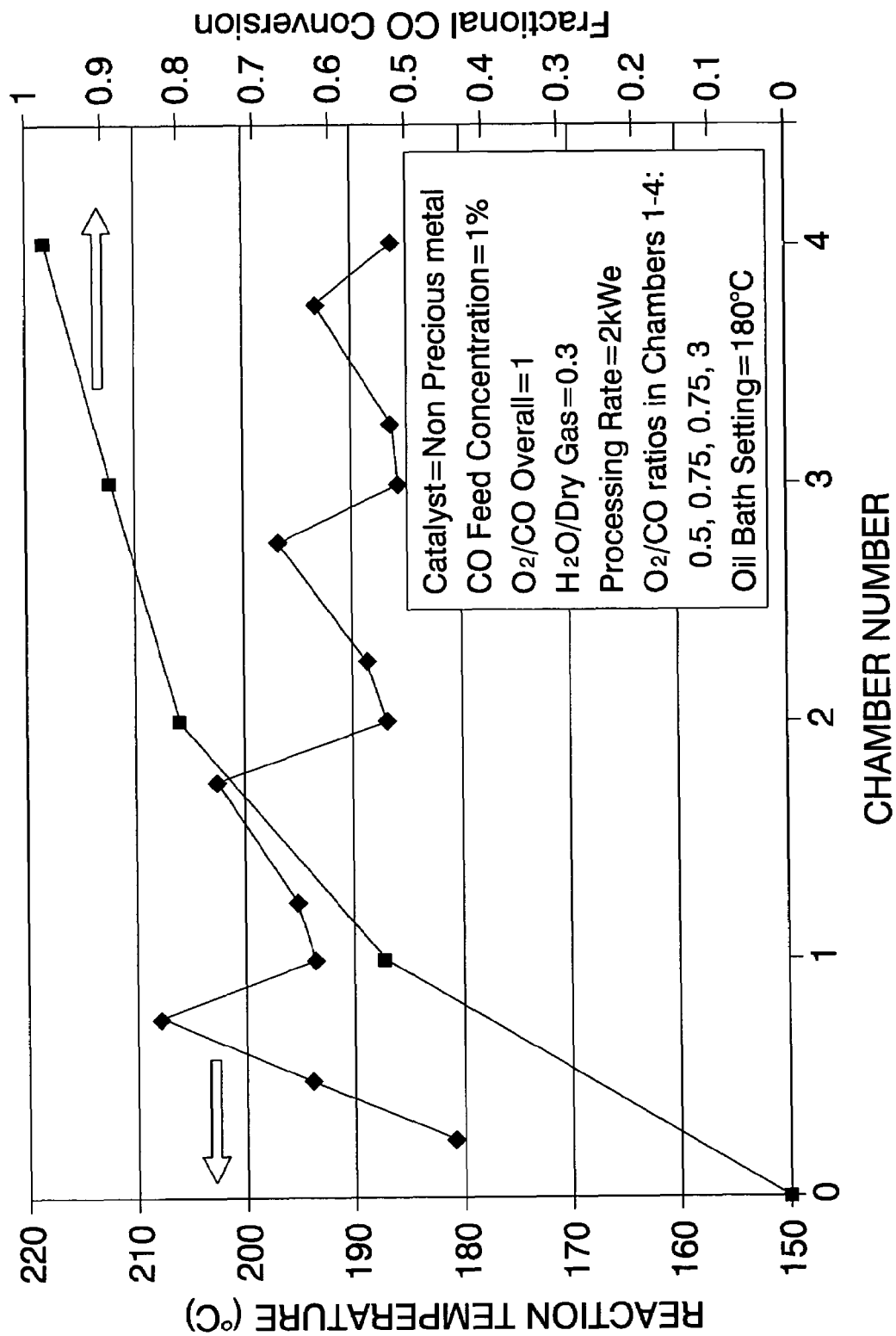

As shown in the test results graphed in FIG. 14, this reactor was able to reach less than 10 ppm CO for a starting concentration of 1% with an overall O2:CO addition of 1.2:1. This was result was accomplished by adding O2:CO in the ratio of 0.5:1 (stoichiometric) and then progressively adding more air to each chamber. The last chamber had an O2:CO ratio of approximately 6:1. Because of the low CO concentration in this chamber, the amount of air added was relatively small and the overall hydrogen loss due to unfavorable reaction was approximately 1%. Additionally, there was higher catalyst loading on the metal foams of each progressive chamber of the reactor. The overall GHSV was 93,000 for a 2 kWe equivalent flow of hydrogen. A characteristic temperature profile for this experimental reactor is shown in FIG. 15. In this case only the non-precious metal first stage PROX catalyst was tested.

Measurements were taken both within the catalyst in each chamber and before and after the catalyst in each chamber. The temperature remained within +/−20 C throughout the reactor, rising within the catalyst and then decreasing as it passed through the series of microchannel heat exchangers. Because the overall expected temperature rise of the reaction under adiabatic conditions is greater than 100° C., these results indicate significant temperature control using the staged heat exchanger and air addition approach.

Prophetic Example One

Microchannel reactors have made it possible to effectively supply heat to highly endothermic reactions and to control temperature for highly exothermic reactions. In the work performed here, microchannel reactors have been used to effectively supply heat to the steam reforming reactor to maintain high conversions, control heat removal in the WGS reactor to optimize the overall reaction conversion, and remove heat to prevent the unwanted hydrogen oxidation reaction in the PROX reactor. These reactors were done with kilowatt scale flows to allow scaling of this prototype to a full-scale 50 kWe reactor system. By scaling up these reactors, the size goals shown in Table III result. The volume and weight goals of 71 kg and 71 liters appears feasible for road vehicle application using the microchannel architecture approach described herein.

TABLE III

| Device | Mass (kg) | Volume (L) |
| --- | --- | --- |
| Steam Reformer | 4.36 | 1.1 |
| Water Vaporizer | 7.44 | 0.8 |
| Air-Air Preheater | 24.68 | 8.1 |
| Recuperator | 1.8 | 0.3 |
| WGS Reactor | 7.20 | 3.4 |
| PROX Reactor | 6.60 | 7.0 |
| Total | 52.08 | 20.7 |

Prophetic Example Two

Another application of the extended surface area structure of FIGS. 6, 7, 9-10, and 18-22 is distributing the condenser and reboiler duties in a distillation process. In distillation columns, heat removal occurs predominantly at the condenser, which is at the lowest temperature in the column and heat addition occurs at the highest temperature in the reboiler. In other columns, condensers and reboilers are located at intermediate stages in the column in order to distribute the heat duties over the temperature range of the column. A more energy efficient approach would be to distribute the duties continuously over the length of the column to maximize the driving force for heat transfer, which requires integrated heat and mass transfer. Interleaving standard planar arrays of heat and mass transfer channels enables this integrated approach, but may result in excess heat transfer surface area because heat transfer timescales are typically much shorter than mass transfer timescales. Extended area structures like those and described in connection with FIGS. 6, 7, 9, and 10 facilitate a degree of decoupling expected to be sufficient to better achieve desired integration.

Prophetic Example Three

The distillation in prophetic example two can be further extended to catalytic distillation. For this arrangement a porous media contains a liquid flow that is made catalytic and a liquid phase reaction occurs along with the mass transfer between the phases. In this example, the heat generation/consumption is the combination of the enthalpy change associated with mass exchange plus the heat of reaction. Operating the column adiabatically without removing or adding the heat of reaction sometime causes an undesired shift in the liquid to vapor flow ratio. Integrating heat exchange offers better control over the design and operation of catalytic distillation columns. Use of microchannels to reduce the length scale for mass transfer is also expected to reduce the size of the distillation hardware, and the implementation of the extended surface area structure concept enables the integration of heat transfer with a more desirable ratio between heat and mass transfer area to potentially further reduce size.

Examples of reactive or catalytic distillation applications that will be performed include, but are not limited to: combination of olefins with alcohols to form ethers (etherification), alkylation, isomerization, selective hydrogenation, esterification, transesterification, hydrolysis, hydration/dehydration, hydrodesulfurization, oligerimization, amination, and dimerization. Esterifications of this type will include arboxylic acid esterification with alcohols, more specific instances of which are lactic acid purification and methyl acetate production. More specific instances of electric hydrogenation include hydrogenation of methyl acetylene and propadiene to propylene, which can be used for product recovery in light olefins (or more particularly, ethylene) production; and selective hydrogenation of refinery C4 and/or C5 olefins to improve downstream alkylation performance.

Prophetic Example Four

Absorption proesses using the extending mass transfer area are performed. This class of mass transfer process experiments includes, but is not limited to: Acid gas treating, Ammonia scrubbing, Absorption heat pumps, Fluoride scrubbing, HCl recovery, Chlorine recovery from vent gas, Flue gas desulfurization, and Light oil recovery, just to name a few.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the invention described herein or by the following claims are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A method, comprising: operating a device including a number of mass transfer microchannels, a heat transfer channel with a boundary defined by a thermally conductive wall, and several thermally conductive fins connected to the wall, the fins each corresponding to a mass transfer surface area along a respective one of the mass transfer microchannels; directing movement of a liquid through each of the mass transfer microchannels; performing a mass transfer process at an interface between the liquid and a gas in each of the mass transfer microchannels; and flowing a heat transfer fluid through the heat transfer channel to regulate the mass transfer process.

2. The method of claim 1, wherein the device includes a number of capillary structures each in a respective one of the mass transfer microchannels to convey the liquid.

3. The method of claim 1, wherein the directing includes flowing a film of the liquid down a surface based on gravitational force.

4. The method of claim 1, wherein the mass transfer process includes collecting the liquid in a reservoir.

5. The method of claim 1, wherein the mass transfer process includes at least one of distillation, condensation, gas absorption, and gas desorption.

6. The method of claim 1, wherein the mass transfer process is reactive.

7. The method of claim 1, wherein the device includes another heat transfer channels connected to each of the fins to transfer heat relative to the mass transfer microchannels.

8. A method, comprising: operating a device including a number of mass transfer microchannels, a plurality of thermally conductive fins, a first heat transfer channel with a boundary defined by a first thermally conductive wall, and a second heat transfer channel with a boundary defined by a second thermally conductive wall, the fins each being connected to the first wall and the second wall to transfer heat by conduction and the fins extending therebetween to separate the mass transfer microchannels from one another; providing a fluid media to the microchannels; performing a mass transfer process with the fluid media in each of the microchannels between the fins; and flowing a heat transfer fluid through the first heat transfer channel and the second heat transfer channel to regulate temperature of the mass transfer process.

9. The method of claim 8, which includes conveying a liquid in the mass transfer microchannels to perform the mass transfer process at an interface between the liquid and a gas.

10. The method of claim 9, wherein the device includes a number of capillary structures each in a respective one of the mass transfer microchannels to convey the liquid.

11. The method of claim 9, which includes collecting the liquid in a reservoir.

12. The method of claim 8, wherein the mass transfer process includes a catalytic chemical reaction.

13. The method of claim 8, wherein a cross section of the device taken perpendicular to the flow path of the fluid media through the mass transfer microchannels defines a microchannel gap height along the cross section and a microchannel gap width along the cross section for each of the mass transfer microchannels, and a ratio of the microchannel gap height to the microchannel gap width is at least three for each of the mass transfer microchannels.

14. A method, comprising: operating a device including a number of mass transfer microchannels, a heat transfer channel with a boundary defined by a thermally conductive wall, and a plurality of thermally conductive fins connected to the wall, the fins each corresponding to a mass transfer surface area along a respective one of the mass transfer microchannels; providing a fluid media through each of the mass transfer microchannels; transferring one or more components of one of a liquid and a gas to another of the liquid and the gas by performing a mass transfer process at a liquid-gas interface in each of the microchannels; and flowing a heat transfer fluid through the heat transfer channel to regulate the mass transfer process by conductively transferring heat through the fins.

15. The method of claim 14, wherein the device includes a number of capillary structures each in a respective one of the mass transfer microchannels to convey the liquid.

16. The method of claim 14, wherein the mass transfer process includes at least one of distillation, condensation, gas absorption, and gas desorption.

17. The method of claim 14, wherein the heat transfer channel is one of two heat transfer channels, the two heat transfer channels being connected to each of the fins opposite one another with the mass transfer microchannels positioned therebetween.

18. The method of claim 14, wherein a cross section of the device taken perpendicular to the flow path of the fluid media through the mass transfer microchannels defines a microchannel gap height along the cross section and a microchannel gap width along the cross section for each of the mass transfer microchannels, and a ratio of the microchannel gap height to the microchannel gap width is at least three for each of the mass transfer microchannels.

19. The method of claim 18, wherein the ratio is at least five for each of the mass transfer microchannels.

20. The method of claim 18, where the ratio is at least ten for each of the mass transfer microchannels.

* * * * *